(12) United States Patent
Santos et al.

(10) Patent No.: US 11,982,605 B2
(45) Date of Patent: May 14, 2024

(54) FILTER DEVICE FOR FLUID FLOW IN AN ANALYZING INSTRUMENT

(71) Applicant: Beckman Coulter, Inc., Brea, CA (US)

(72) Inventors: Gabriel Santos, Miami, FL (US); Janet F. Reyes, Miami, FL (US); Gregory M. Colella, Upper Montclair, NJ (US)

(73) Assignee: Beckman Coulter, Inc., Brea, CA (US)

( * ) Notice: Subject to any disclaimer, the term of this patent is extended or adjusted under 35 U.S.C. 154(b) by 0 days.

(21) Appl. No.: 17/496,463

(22) Filed: Oct. 7, 2021

(65) Prior Publication Data

US 2022/0026324 A1 Jan. 27, 2022

Related U.S. Application Data

(62) Division of application No. 15/777,556, filed as application No. PCT/US2016/062591 on Nov. 17, 2016, now Pat. No. 11,169,060.

(60) Provisional application No. 62/257,031, filed on Nov. 18, 2015.

(51) Int. Cl.
| | |
|---|---|
| *G01N 1/40* | (2006.01) |
| *G01N 15/14* | (2006.01) |
| *G01N 15/1404* | (2024.01) |
| *G01N 35/00* | (2006.01) |

(52) U.S. Cl.
CPC ............ *G01N 1/4077* (2013.01); *G01N 1/40* (2013.01); *G01N 15/14* (2013.01); *G01N 15/1404* (2013.01); *G01N 35/00* (2013.01); *G01N 2001/4088* (2013.01); *G01N 2015/1418* (2013.01); *G01N 2035/00277* (2013.01); *G01N 2035/00475* (2013.01)

(58) Field of Classification Search
CPC ........ G01N 1/4077; G01N 1/40; G01N 15/14; G01N 15/1404; G01N 35/00; G01N 2001/4088; G01N 2015/1418; G01N 2035/00277; G01N 2035/00475
USPC .......................................... 73/863.23, 863.2
See application file for complete search history.

(56) References Cited

U.S. PATENT DOCUMENTS

| | | | |
|---|---|---|---|
| 4,869,116 A | 9/1989 | Meyrat | |
| 5,064,542 A * | 11/1991 | Negersmith | B01D 39/10 436/63 |
| 5,560,889 A * | 10/1996 | Ogino | G01N 1/40 436/178 |

(Continued)

FOREIGN PATENT DOCUMENTS

| | | | |
|---|---|---|---|
| CH | 654754 | * | 3/1986 |
| CN | 206375744 U | * | 8/2017 |

(Continued)

OTHER PUBLICATIONS

Translation CH-654754 (Year: 1986).*

(Continued)

*Primary Examiner* — Peter J Macchiarolo
*Assistant Examiner* — Monica S Young
(74) *Attorney, Agent, or Firm* — McAndrews, Held & Malloy, Ltd.

(57) ABSTRACT

A filtering device is provided to an analyzing instrument to block the passage of oversized particles that may otherwise clog the aperture of a sample analyzing device. The filtering device can be arranged to be proximate to the mixing chamber. In certain examples, the filtering device is placed at or adjacent an output port of the mixing chamber.

7 Claims, 18 Drawing Sheets

(56) References Cited

U.S. PATENT DOCUMENTS

| | | | | |
|---|---|---|---|---|
| 5,567,309 A | * | 10/1996 | Classon | G01N 1/4077 210/244 |
| 5,656,499 A | | 8/1997 | Chupp | |
| 6,211,956 B1 | * | 4/2001 | Nicoli | G01N 15/02 356/337 |
| 2006/0203226 A1 | * | 9/2006 | Roche | G01N 15/1459 356/246 |
| 2006/0210438 A1 | | 9/2006 | Nagai | |
| 2006/0252054 A1 | * | 11/2006 | Lin | A61B 5/150755 435/7.23 |
| 2006/0269446 A1 | * | 11/2006 | Gilbert | B01L 9/527 422/400 |
| 2008/0098828 A1 | * | 5/2008 | Li | G01N 35/1097 73/863.73 |
| 2009/0068062 A1 | * | 3/2009 | Jafari | G01N 1/38 436/179 |
| 2010/0051552 A1 | * | 3/2010 | Rohde | A61M 1/287 210/644 |
| 2010/0152042 A1 | * | 6/2010 | Do | B82Y 30/00 977/810 |
| 2012/0308445 A1 | * | 12/2012 | Roper | G01N 35/1016 210/322 |
| 2013/0017744 A1 | | 2/2013 | Nakamura et al. | |
| 2013/0045523 A1 | * | 2/2013 | Leach | B01F 21/22 435/283.1 |
| 2013/0047711 A1 | * | 2/2013 | Shibata | G01N 35/00732 73/64.56 |
| 2014/0170739 A1 | * | 6/2014 | Thomas | G01N 15/1404 435/288.7 |
| 2016/0169781 A1 | * | 6/2016 | Takai | G01N 1/4077 435/309.1 |
| 2020/0030537 A1 | * | 1/2020 | Atterbury | A61M 5/5086 |
| 2020/0241025 A1 | * | 7/2020 | Asakura | G01N 35/1065 |

FOREIGN PATENT DOCUMENTS

| | | | | |
|---|---|---|---|---|
| CN | 112393959 A | * | 2/2021 | |
| CN | 113008724 | * | 6/2021 | |
| EP | 0448217 A | | 9/1991 | |
| JP | S6140915 A | * | 2/1986 | |
| JP | 2006086739 | | 3/2006 | |
| JP | 2006194788 A | | 7/2006 | |
| JP | 2009160615 A | | 7/2009 | |
| JP | 2014178334 A | | 9/2014 | |
| WO | WO-2012057498 A2 | * | 5/2012 | C12M 47/02 |
| WO | WO-2016031971 A1 | * | 3/2016 | B01L 3/502761 |

OTHER PUBLICATIONS

Translation CN-113008724 (Year: 2021).*
Translation JP-S6140915 (Year: 1986).*
Japan Patent Office, Official Action regarding Application No. 2018-525675, dated Nov. 4, 2020, 3 pages.
Japan Patent Office, Official Action regarding Application No. 2018-525675, dated Oct. 18, 2021, 27 pages.

* cited by examiner

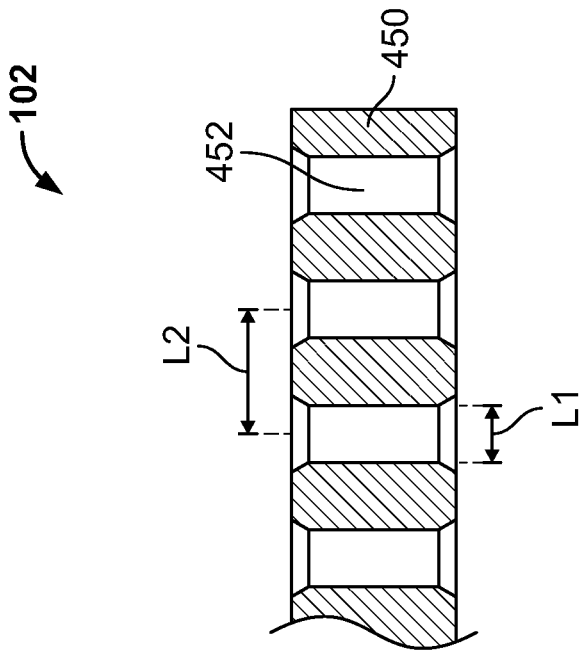
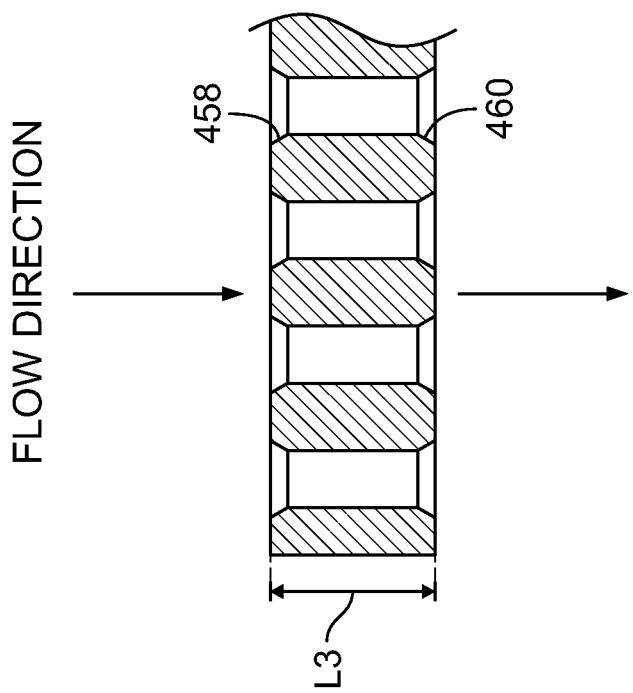
FIG. 13

FILTER DEVICE FOR FLUID FLOW IN AN ANALYZING INSTRUMENT

CROSS REFERENCE

This application is a divisional of U.S. patent application Ser. No. 15/777,556 filed on May 18, 2018, which was filed pursuant to 35 U.S.C. 371 as a U.S. National Phase application of International Patent Application No. PCT/US2016/062591, which was filed Nov. 17, 2016, claiming the benefit of priority to U.S. provisional patent application Ser. No. 62/257,031, filed Nov. 18, 2015. The entire text of the aforementioned applications is incorporated herein by reference in its entirety.

BACKGROUND

Hematology analyzers are automated machines that identify different kinds and characteristics of particles (e.g., blood cells) contained in a fluid (e.g., blood sample). For example, hematology analyzers operate to count the number of different kinds of blood cells in a blood sample.

In certain examples, hematology analyzers can use several types of flow cytometry techniques, such as an electrical impedance method, a light scatter method, and/or a method of using fluorescent dyes to differentiate cell types. Some hematology analyzers are configured to classify a single cell based on its particular size or shape, which can be determined by either the degree of electrical impedance it causes or the type of light scatter pattern it demonstrates. Other hematology analyzers can identify a single cell by its biochemical or antigenic properties, which can be classified using fluorescent dyes.

Some hematology analyzers are configured to enable sample particles to pass through a small aperture in a flow cell. In certain examples, foreign particles, such as coring particles, flow into the aperture in the flow cell, along with the sample particles. Such foreign particles can be large enough to clog the aperture in the flow cell, thereby delaying or stopping the operation of the flow cell.

SUMMARY

In general terms, this disclosure is directed to an analyzing instrument with a filtering device. In one possible configuration and by non-limiting example, the filtering device is arranged to be proximate to a chamber to which a sample is dispensed. Various aspects are described in this disclosure, which include, but are not limited to, the following aspects.

One aspect is an analyzing instrument including a sample container, a chamber, an aspiration device, a sample analyzing device, a flow tube, and a filtering device. The sample container contains a sample. The chamber includes an inlet port and an outlet port. The aspiration device includes a probe configured to pierce the sample container and aspirate at least a portion of the sample from the sample container. The aspiration device is operable to move the probe and insert the probe through the inlet port of the chamber to dispense the at least a portion of the sample into the chamber. The sample analyzing device is configured to analyze the sample. The flow tube is connected to the outlet port of the chamber and configured to form a fluid communication path between the chamber and the sample analyzing device. The filtering device is secured proximate to the chamber. The filtering device is configured to prevent at least some of oversized particles from passing therethrough while enabling particles to be analyzed to pass therethrough, the oversized particles at least partially generated from the sample container as the probe of the aspiration device pierces the sample container.

Another aspect is a method of filtering a sample in an analyzing instrument. The method includes: securing a filtering device proximate to a chamber, the filtering device configured to prevent at least some of oversized particles from passing therethrough; and connecting a flow tube to an outlet port of the chamber to form a fluid communication path between the chamber and a sample analyzing device.

Yet another aspect is a filtering device for filtering a sample in a hematology analyzer. The filtering device includes a plate having a plurality of apertures configured to prevent at least some of oversized particles from passing therethrough while enabling particles to be analyzed to pass therethrough. The oversized particles are at least partially generated from a sample container as an aspiration device pierces the sample container. The plate configured to be secured adjacent an outlet port of a chamber. In certain examples, the plate is secured within a flow tube adjacent the outlet port of the chamber. The flow tube forming a fluid communication between the chamber and a flow cell. In certain examples, the plate is secured at an end of the output port of the chamber.

Yet another aspect is a system for filtering a sample in an analyzing instrument. The system includes a flow tube fitting to an outlet port of a chamber and configured to form a fluid communication path between the chamber and a sample analyzing device; and a filtering device arranged proximate to the chamber. The filtering device is configured to prevent at least some of oversized particles from passing therethrough while enabling particles to be analyzed to pass therethrough. The oversized particles is at least partially generated from a sample container as an aspiration device pierces the sample container to aspirate at least a portion of the sample from the sample container.

BRIEF DESCRIPTION OF THE DRAWINGS

FIG. 13 is a cross-sectional side view of the example filtering device taken along cross-section A-A shown in FIG. 12.

DETAILED DESCRIPTION

Figure 1:
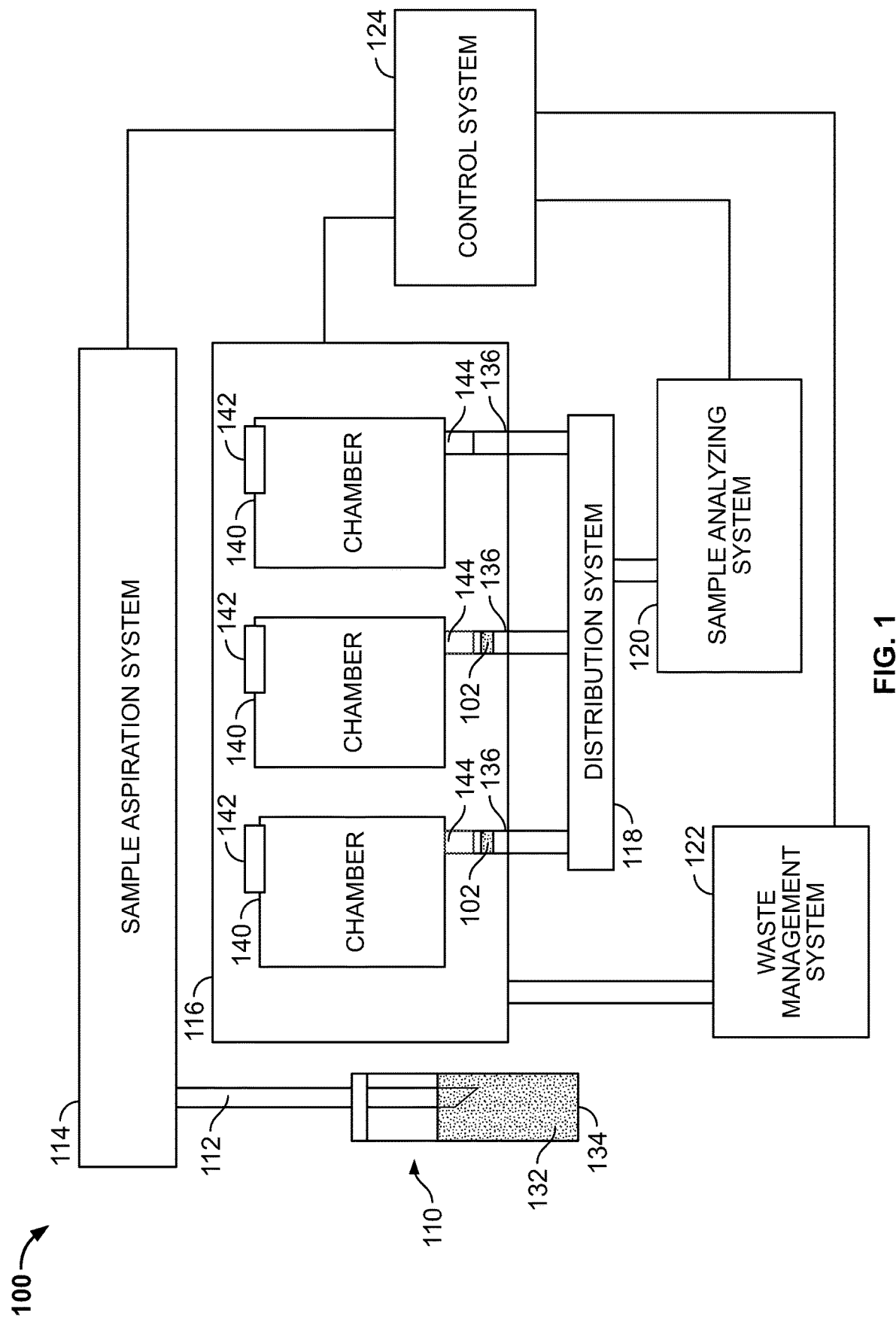
FIG. 1 is a schematic block diagram of an example instrument including a filtering device.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, analyzing instruments, such as hematology analyzers, operate to enable fluid to flow through a fluid circuit including a small aperture. In some analyzing instruments, a sample fluid is passed through a small aperture of a sample analyzing device (e.g., a flow cell). The aperture can be sized to reduce the number of particles (e.g., blood cells) that can pass through it at a time (i.e., to cause the particles to pass in single file), so that the content of the sample fluid can be evaluated. As the aperture is very small, it is susceptible to clogging with oversized particles, which can block the aperture of the flow cell. For example, if the sample contains any particles, or aggregate of particles, greater in size than the cross section of the aperture, the aperture may become clogged, thereby delaying or stopping the operation of the instrument. Some examples of oversized particles are contaminants, such as cap debris generated from a sample container when the sample container is pierced by a needle.

The present disclosure describes a filtering device for an analyzing instrument. The filtering device is configured to block the passage of oversized particles that may otherwise clog the aperture of a sample analyzing device, such as a flow cell, thereby reducing or eliminating the chance of clogging of the sample analyzing device. The filtering device is used for various hematology systems. By way of example, the filtering device is used with an open aspiration circuit, in which at least one open mixing chamber (e.g., a mixing chamber with an inlet through which an aspiration probe extends to dispense a sample into the chamber) is used to supply a sample to a sample analyzing device. In some embodiments, the filtering device is arranged to be proximate to the mixing chamber. The filtering device can be placed at or adjacent an output port of the mixing chamber. For example, the filtering device is secured within a flow tube connected to the outlet port of the chamber such that the filtering device is located just after the outlet port of the chamber. In other examples, the filtering device is secured at an end of the outlet port of the chamber within the chamber.

FIG. 1 is a schematic block diagram of an example instrument 100 including a filtering device 102. In this example, the instrument 100 is a hematology analyzer that includes a sample source 110, a sample aspiration probe 112, a sample aspiration system 114, a sample preparation system 116, a distribution system 118, a sample analyzing system 120, a waste management system 122, and a control system 124. Other embodiments of the instrument 100 can be other types of equipment for analyzing a sample fluid.

In some embodiments, the instrument 100 is configured to detect populations of different cells in a blood sample. The results provided by the instrument 100 can be collectively known as complete blood counts (CBCs) or complete blood count with differentiation of cells (CBCs with Diff). In other embodiments, the instrument 100 can provide red blood cell (RBC) counts, hemoglobin in RBCs, hematocrit levels, platelet counts, corpuscular data and counts of five different types of white blood cells. In yet other embodiments, the instrument 100 is configured to measure numbers nucleated red blood cells (NRBCs) that is necessary to confirm specific diagnoses.

The instrument 100 can be associated with, or implemented in, various hematology analyzers in which a sample tube is pierced and dispensed into a chamber. The instrument 100 can be used with any other hematology analyzers that operate to pierce a stopper (e.g., a cap 152 in FIG. 2) to obtain a sample into a fluidic path.

The instrument 100 includes a fluid circuit 130 that delivers a fluid 132 through an aperture 320 (FIG. 7) of the sample analyzing system 120. As described below, the aperture 320 has a reduced size that may become clogged by oversized particles contained in the sample. The filtering device 102 is positioned downstream of a mixing chamber 140 in the sample preparation system 116 to block the passage of the oversized particles (e.g., coring particles, dust, and debris), thereby protecting the sample analyzing system 120 from clogging. For example, the filtering device 102 is disposed at or adjacent an outlet of the mixing chamber 140.

The sample source 110 provides the fluid 132 (also referred to as sample) that is to be analyzed in the sample analyzing system 120. In this example, the sample source 110 is a blood sample or specimen. The sample source 110 includes a sample container 134 that contains the sample 132. Examples of the sample container 134 include a test tube. Other receptacles or vials can be used as the sample container 134 in other embodiments. An example of the sample container 134 is described and illustrated in more detail with reference to FIG. 3.

The sample aspiration probe 112 is provided in some embodiments to extend into the sample source 110, aspirate the sample from the sample source 110, and dispense the sample to the sample preparation system 116. In some embodiments, the sample aspiration probe 112 is configured as a needle that includes one or more apertures therein through which the sample can be received from the sample source 110.

The sample aspiration system 114 is arranged and configured to aspirate the sample from the sample source 110 and deliver the sample along the fluid circuit 130 from the sample source 110 to the sample preparation system 116. A more detailed example of the sample aspiration system 114 is illustrated and described with reference to FIG. 4.

The sample preparation system 116 operates to receive the sample from the sample source 110 and other fluids (such as reagents and diluent) from other sources, and selectively mix them to prepare a test fluid. The sample preparation system 116 is in fluid communication with the sample analyzing system 120 using at least one flow tube 136. The sample preparation system 116 supplies the test fluid to the sample analyzing system 120 through the flow tube 136. In some embodiments, the distribution system 118 is disposed between the sample preparation system 116 and the sample analyzing system 120 for selective connection between multiple mixing chambers 140 and the sample analyzing system 120.

In some embodiments, the sample preparation system 116 includes at least one mixing chamber 140 for mixing the sample with one or more other fluids. The mixing chamber 140 has an inlet 142 through which the sample aspiration probe 112 extends to dispense the sample into the mixing chamber. As the mixing chamber 140 is open through the inlet 142, the mixing chamber 140 of this type can be referred to herein as an open mixing chamber. The mixing chamber 140 can be in fluid communication with the sample analyzing system 120 through the flow tube 136, either directly or via the distribution system 118.

As described herein, the sample preparation system 116 includes the filtering device 102 configured to block the passage of the oversized particles, which would otherwise clog the sample analyzing system 120. In some embodiments, the filtering device 102 is disposed downstream of the mixing chamber 140 and upstream of the distribution system 118. In some examples, the filtering device 102 is secured within the flow tube 136 at or adjacent an end of the flow tube 136 that fits an outlet 144 of the chamber 140. In other examples, the filtering device 102 is disposed at the outlet 144 of the chamber 140. An example of the filtering device 102 is illustrated and described in more detail with reference to FIG. 8.

In some embodiments, the sample preparation system 116 includes a plurality of mixing chambers 140 for different purposes. In some embodiments, the mixing chambers 140 include four mixing chambers. For example, a first mixing chamber is used to prepare a test fluid or sample (e.g., NRBC sample) for analyzing nucleated red blood cells (NRBC) (e.g., for analysis of NRBC populations). A second mixing chamber is used to prepare a test fluid or sample (e.g., Differential sample) for analyzing a white blood cell differential (e.g., for measurement of the percentage of each type of white blood cell present in a blood). A third mixing chamber is used to prepare a test fluid or sample (e.g., Reticulocyte sample) for analyzing a reticulocyte count (e.g., for measurement of the percentage of reticulocytes in a blood). A fourth mixing chamber is used for stain and blood mixture. In other embodiments, a different number of chambers 140 are provided for different operations.

In some embodiments, the sample preparation system 116 includes a heat exchange block (also referred to herein as a temperature control block) configured to provide a temperature controlled environment for the first, second, and third mixing chambers, as well as incoming reagents and air used for air jet mixing. The heat exchange block can be made of cast aluminum. The temperature control block includes a plurality of air and reagent ports associated with the mixing chambers. The fourth mixing chamber can have a ceramic body and is fitted with an external heater and thermistor element. The sample preparation system 116 can further include a plurality of valves (e.g., solenoid valves) associated with the mixing chambers, respectively.

The distribution system 118 operates to distribute the test fluid from the sample preparation system 116 to the sample analyzing system 120. The distribution system 118 can also operate to direct diluent rinse to the mixing chamber 140 and then directly to the waste management system 122. In some embodiments, the distribution system 118 includes a valve system operable to selectively direct fluids from different mixing chambers 140 in the sample preparation system 116 to the sample analyzing system 120. The distribution system 118 can also direct fluids for backflushing and cleaning process for each mixing chamber 140.

Some embodiments of the valve system includes a face-seal valve having two ceramic pads, one of which remains stationary and the other of which rotates at intervals for switching between the distribution paths from different mixing chambers 140 to the sample analyzing system 120.

The sample analyzing system 120 operates to analyze the test fluid that is fed thereto. An example of the sample analyzing system 120 is illustrated and described with reference to FIG. 7.

The waste management system 122 operates to drain any remaining fluid from one or more mixing chambers 140. In some embodiments, the fluid circuit 130 terminates at the waste management system 122 where the sample is collected and store for subsequent use or disposal.

The control system 124 operates to control the operation of the instrument 100 and to analyze the content of the sample. In some embodiments, the control system 124 operates to control the sample aspiration system 114, the sample preparation system 116, and the sample analyzing system 120, and the waste management system 122.

Figure 2:
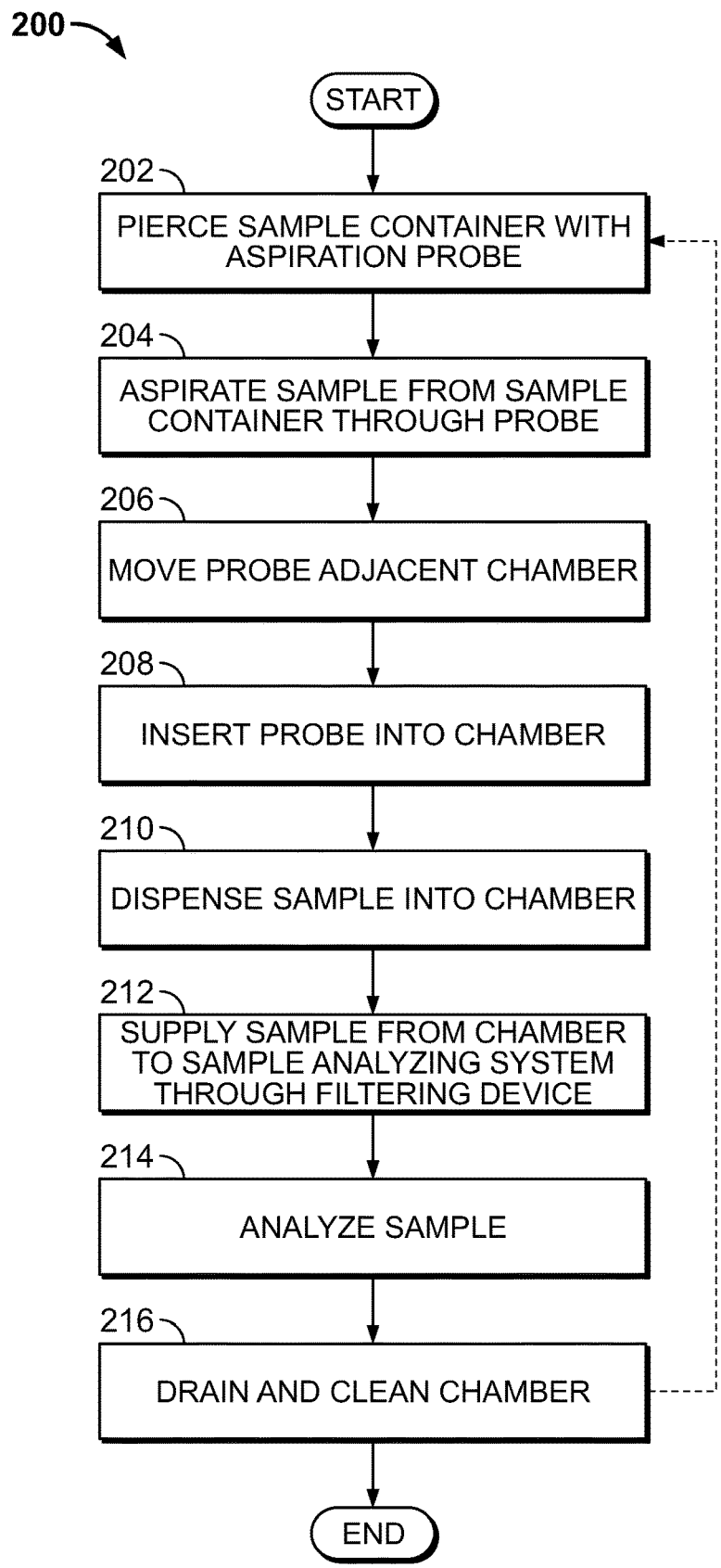
FIG. 2 is a flowchart of an example method for operating the instrument.

FIG. 2 is a flowchart of an example method 200 for operating the instrument 100. In some embodiments, the method 200 includes operations 202, 204, 206, 208, 210, 212, 214, and 216. In some embodiments, the operations 202, 204, 206, 208, and 210 are performed by the sample aspiration system 114, the operation 212 is performed by the sample preparation system 116, the operation 214 is performed by the sample analyzing system 120, and the operation 216 is performed by the waste management system 122.

At the operation 202, the instrument 100 (e.g., the sample aspiration system 114) operates to pierce the sample container 134 with the sample aspiration probe 112. The sample aspiration system 114 can operate to pierce a cap 152 (FIG. 3) of the sample container 134 and extend the sample aspiration probe 112 into the sample container 134.

At the operation 204, the instrument 100 (e.g., the sample aspiration system 114) operates to aspirate the sample from the sample container through the sample aspiration probe 112.

At the operation 206, the instrument 100 (e.g., the sample aspiration system 114) moves the sample aspiration probe 112 adjacent the sample preparation system 116. In some embodiments, the sample aspiration system 114 moves the sample aspiration probe 112 above the mixing chamber 140 (e.g., above the inlet 142 of the mixing chamber 140).

At the operation 208, the instrument 100 (e.g., the sample aspiration system 114) operates to insert the sample aspiration probe 112 into the mixing chamber 140.

At the operation 210, the instrument 100 (e.g., the sample aspiration system 114) operates to dispense the aspirated sample into the mixing chamber 140.

At the operation 212, the instrument 100 (e.g., the sample preparation system 116) operates to supply the sample from the mixing chamber 140 to the sample analyzing system 120 through the filtering device 102. Before supplying the sample, the sample preparation system 116 receives one or more other fluids and mixes them with the sample from the sample source 110 to produce a test fluid within the mixing chamber 140. The sample preparation system 116 then supplies the test fluid from the mixing chamber 140 to the sample analyzing system 120.

At the operation 214, the instrument 100 (e.g., the sample analyzing system 120) operates to analyze the test fluid (including the aspirated sample). An example operation of analyzing the test fluid is illustrated and described with reference to FIG. 7.

At the operation 216, the instrument 100 (e.g., the waste management system 122) operates to drain the remaining test fluid from the sample preparation system 116 (e.g., the mixing chamber 140) and clean the sample preparation system 116 for the next cycles.

Figure 3:
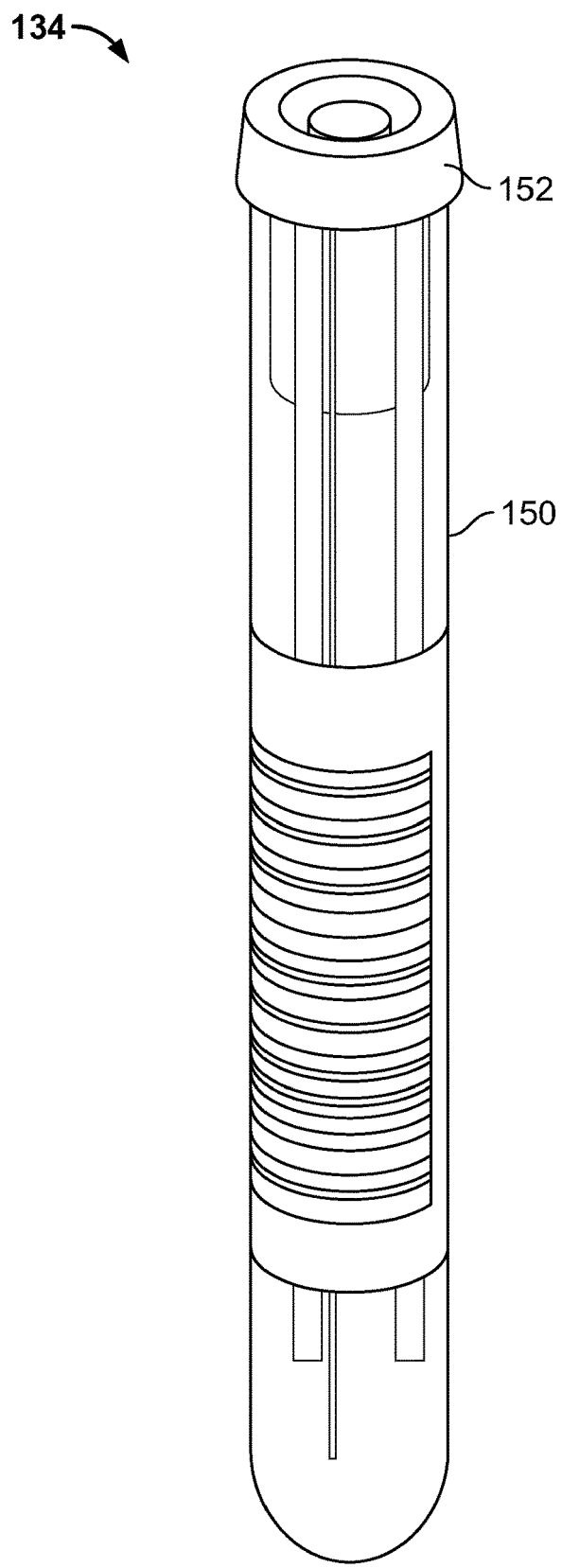
FIG. 3 illustrates an example sample container.

FIG. 3 illustrates an example sample container 134. In some embodiments, the sample container 134 includes a container body 150 and a cap 152. The container body 150 is a tube, vial, or any other receptacle suitable for containing a sample. The container body 150 has an opening at its top, which is sealingly covered with a cap 152 (also referred to herein as a stopper or cover). The cap 152 can be made of rubber, cork, or other plastic and configured to be pierced by the sample aspiration probe 112. When the cap 152 is pierced by the sample aspiration probe 112, coring particles (e.g., fragments or crumbs of the cap 152) can be generated from the cap 152 and included as contaminants in the sample. The coring particles include cap debris and are typically oversized particles that can clog the sample analyzing system 120. The coring particles can be included in the sample and aspirated along with the sample through the sample aspiration probe 112. Thus, the sample and the coring particles will be dispensed together into a mixing chamber. Further, the coring particles can stick to the outside of the sample aspiration probe 112 when the sample aspiration probe 112 pierces the cap or stopper of the sample container, and can then invade the mixing chamber when the sample aspiration probe 112 is inserted into the mixing chamber to dispense the aspirated sample. The oversized particles including the coring particles are illustrated and described in more detail with reference to FIG. 9.

Figure 4:
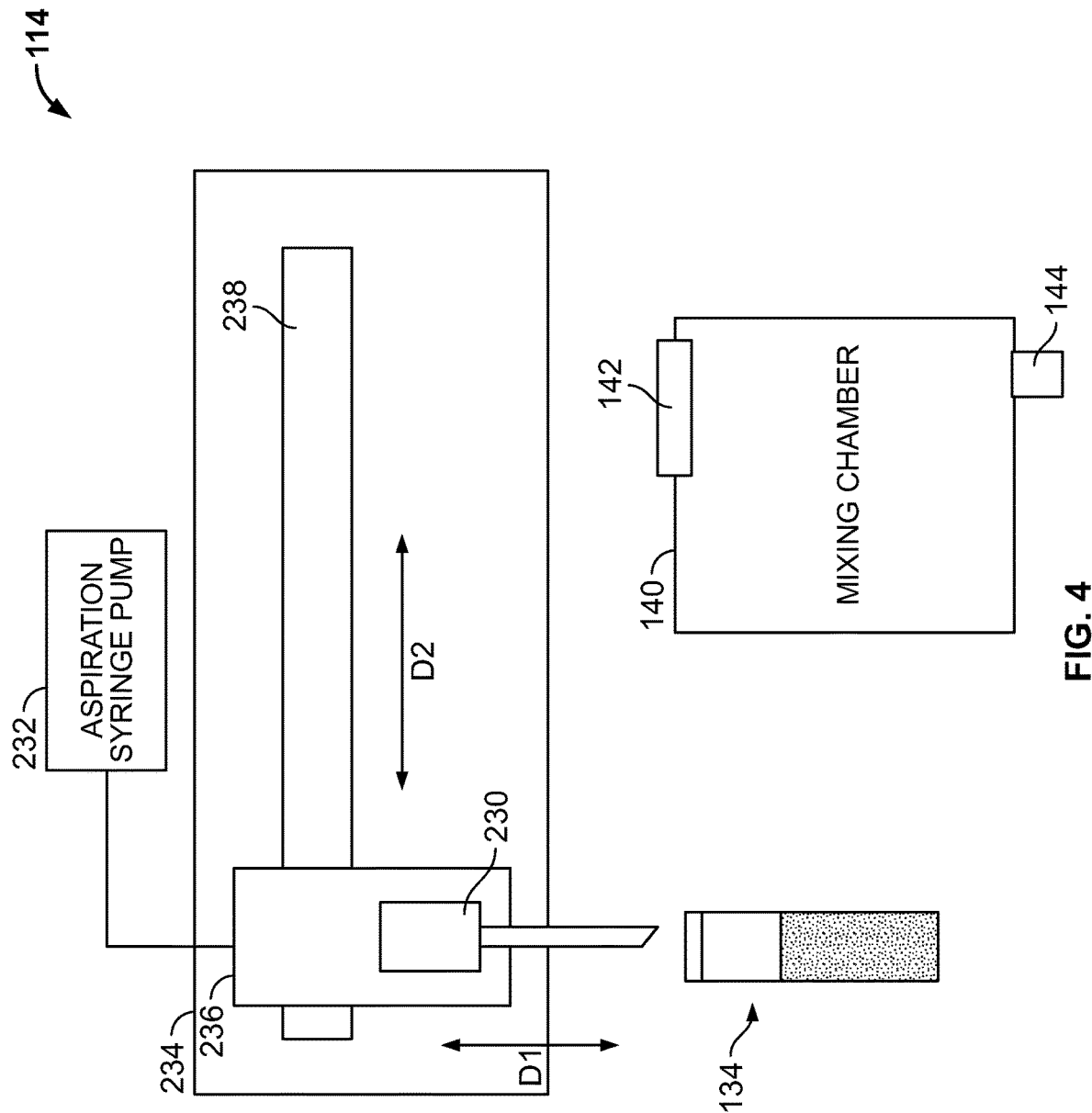
FIG. 4 is a schematic block diagram of an example sample aspiration system.
Figure 5:
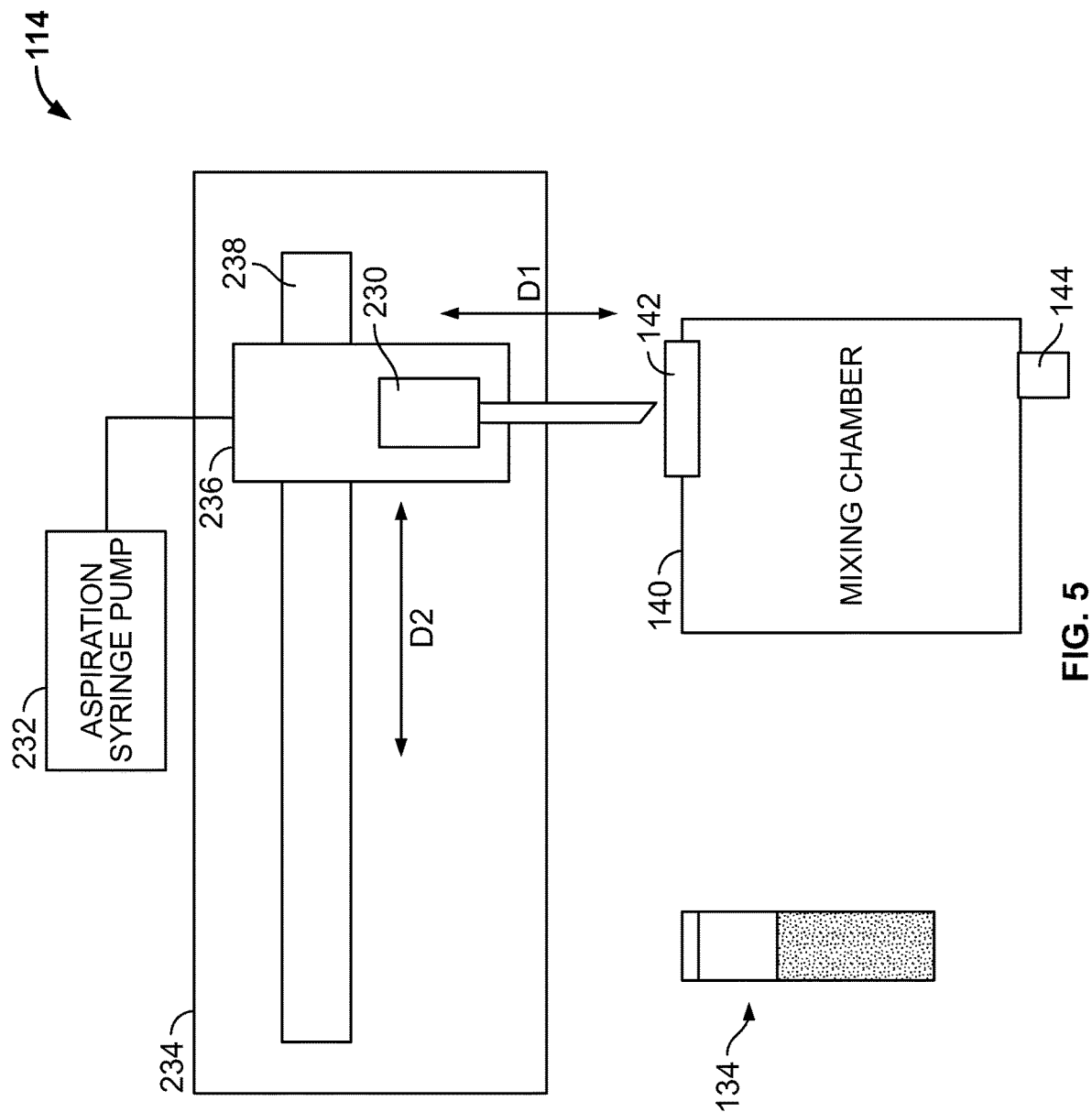
FIG. 5 is a schematic block diagram of the sample aspiration system of FIG. 4, illustrating a proving device is arranged with a mixing chamber.

Referring to FIGS. 4 and 5, an example of the sample aspiration system 114 including the sample aspiration probe 112 is described.

FIG. 4 is a schematic block diagram of an example sample aspiration system 114. In some embodiments, the sample aspiration system 114 includes a probing device 230, an aspiration syringe pump 232, and a probe drive system 234.

The sample aspiration system 114 operates to locate, verify, and pierce the sample container 134. The sample aspiration system 114 further operates to aspirate a sample from the sample container 134, and dispense the sample into any or all of the mixing chambers 140. The sample aspiration system 114 can further operate to aspirate an aliquot of sample from a stain chamber.

The probing device 230 includes the sample aspiration probe 112 and a supporting assembly for the sample aspiration probe 112.

The aspiration syringe pump 232 operates to aspirate a sample from the sample container 134 and dispense at least a portion of the sample to one or more of the mixing chambers 140 at a predetermined amount.

The probe drive system 234 operates to move the probing device 230 as necessary. In some embodiments, the probe drive system 234 includes a vertical drive assembly 236 and a horizontal drive assembly 238.

The vertical drive assembly 236 moves the probing device 230 vertically relative to the sample container 134 and the mixing chambers 140. For example, the vertical drive assembly 236 drives the probing device 230 up and down (e.g., direction D1) above the sample container 134 to aspirate sample therefrom, and up and down (e.g., the direction D1) above the mixing chamber 140 to dispense the aspirated sample into the mixing chamber 140.

The horizontal drive assembly 238 moves the vertical drive assembly 236 horizontally (e.g., direction D2) to an appropriate location for aspirating a sample from the sample container 134 and dispensing at least a portion of the sample to one or more of the mixing chambers 140.

Referring to FIG. 4, the probe drive system 234 moves the probing device 230 above the sample container 134. The probe drive system 234 can operate to lower the probing device 230 to pierce the cap 152 of the sample container 134 and aspirate a sample therefrom. Once the sample is aspirated, the probe drive system 234 operates to raise the probing device 230 until the probing device 230 becomes clear of the sample container 134.

FIG. 5 is a schematic block diagram of the sample aspiration system 114 of FIG. 4, in which the probing device 230 is arranged with the mixing chamber 140. Once the sample is aspirated as illustrated in FIG. 4, the probe drive system 234 can horizontally move the probing device 230 until the probing device 230 is positioned above the mixing chamber 140. The probe drive system 234 can then lower the probing device 230 to insert the sample aspiration probe 112 into the chamber 140 through the inlet 142, so that the aspiration syringe pump 232 dispenses at least a portion of the sample to the mixing chambers 140. Once the sample is dispensed to the mixing chamber 140, the probe drive system 234 can operate to move the probing device 230 to dispense the sample into another mixing chamber 140, or return the probing device 230 to the sample container 134 for aspirating another sample therefrom.

Referring again to FIGS. 4 and 5, some embodiments of the vertical drive assembly 236 include a motor for driving the probing device 230 vertically along a vertical guide rail. The vertical drive assembly 236 can further include a sensor for detecting a location of the probing device.

In some embodiments, the horizontal drive assembly 238 includes a motor for driving the vertical drive assembly 236 horizontally relative to a support plate. The horizontal drive assembly 238 can further include one or more guide rods for supporting and guiding the vertical drive assembly 236 therealong. The motor can be connected to the vertical drive assembly 236 through a drive belt, and the drive belt converts the rotation of a motor output into the linear movement of the vertical drive assembly 236.

Figure 6:
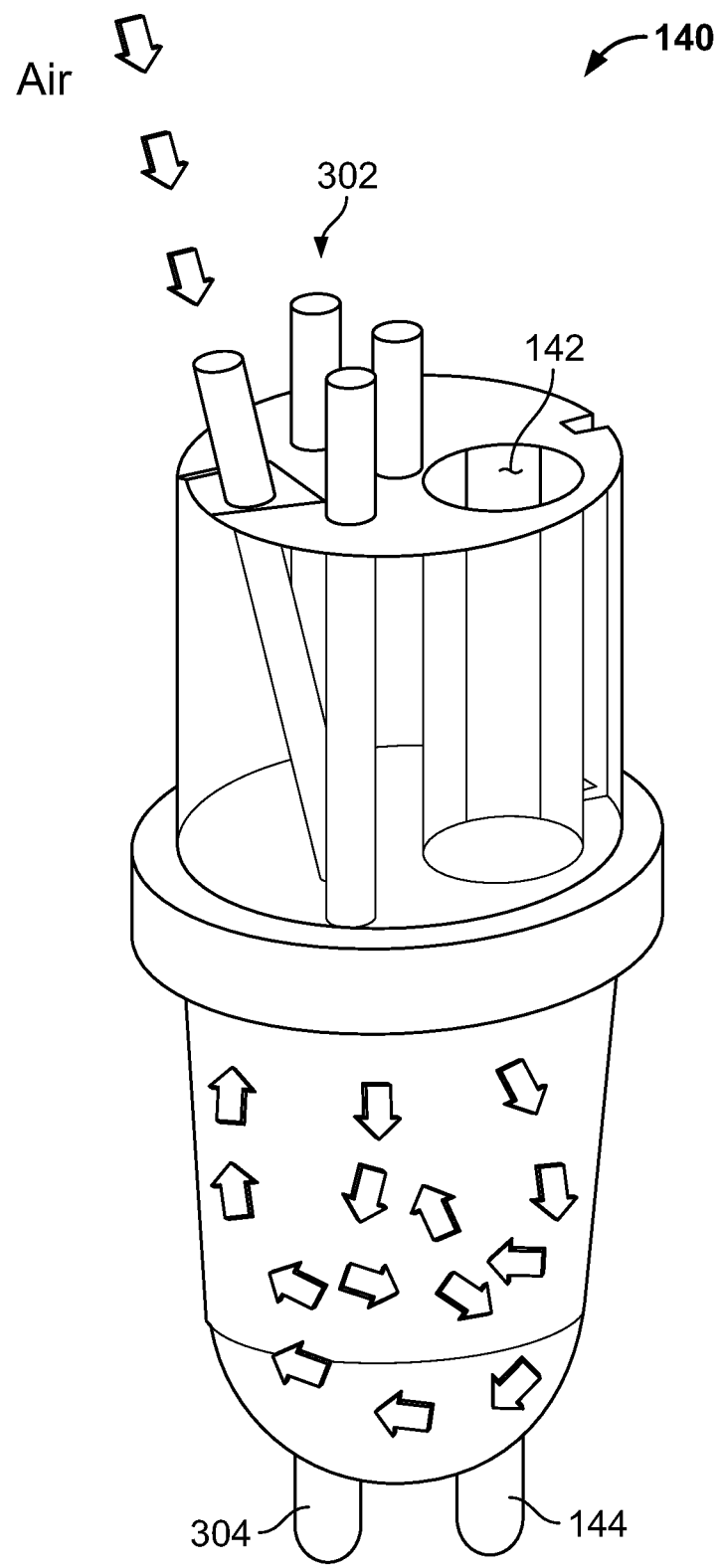
FIG. 6 schematically illustrates an example mixing chamber.

FIG. 6 schematically illustrates an example mixing chamber 140. In some embodiments, in addition to the sample inlet 142 and the sample outlet 144, the mixing chamber 140 includes a plurality of inlet ports 302 and a drain outlet 304.

The mixing chambers 140 (including the mixing chambers 270, 272, 274, and 276) are used to receive samples from the sample source 110, prepare different dilutions specific for different types of analysis, and transfer the prepared samples to the sample analyzing system 120, which then operate to sense the prepared samples and generate sample data.

The inlet ports 302 include ports configured to receive reagents, or other fluids, required for each dilution prepared in the associated mixing chambers 140. In some embodiments, the inlet ports 302 include an air jet port configured to receive a pressurized air jet into the mixing chamber 140 therethrough. The pressurized air jet that passes through the air jet port generates three-dimensional air flow patterns that tumble the blood and reagent mixture. In other embodiments, the mixing chamber 140 is shaken to mix the blood and the reagent, with or without using the pressurized air jet.

The drain outlet 304 is in fluid communication ultimately with the waste management system 122. The drain outlet 304 is used to drain waste out of the mixing chamber 140 into the waste management system 122.

Figure 7:
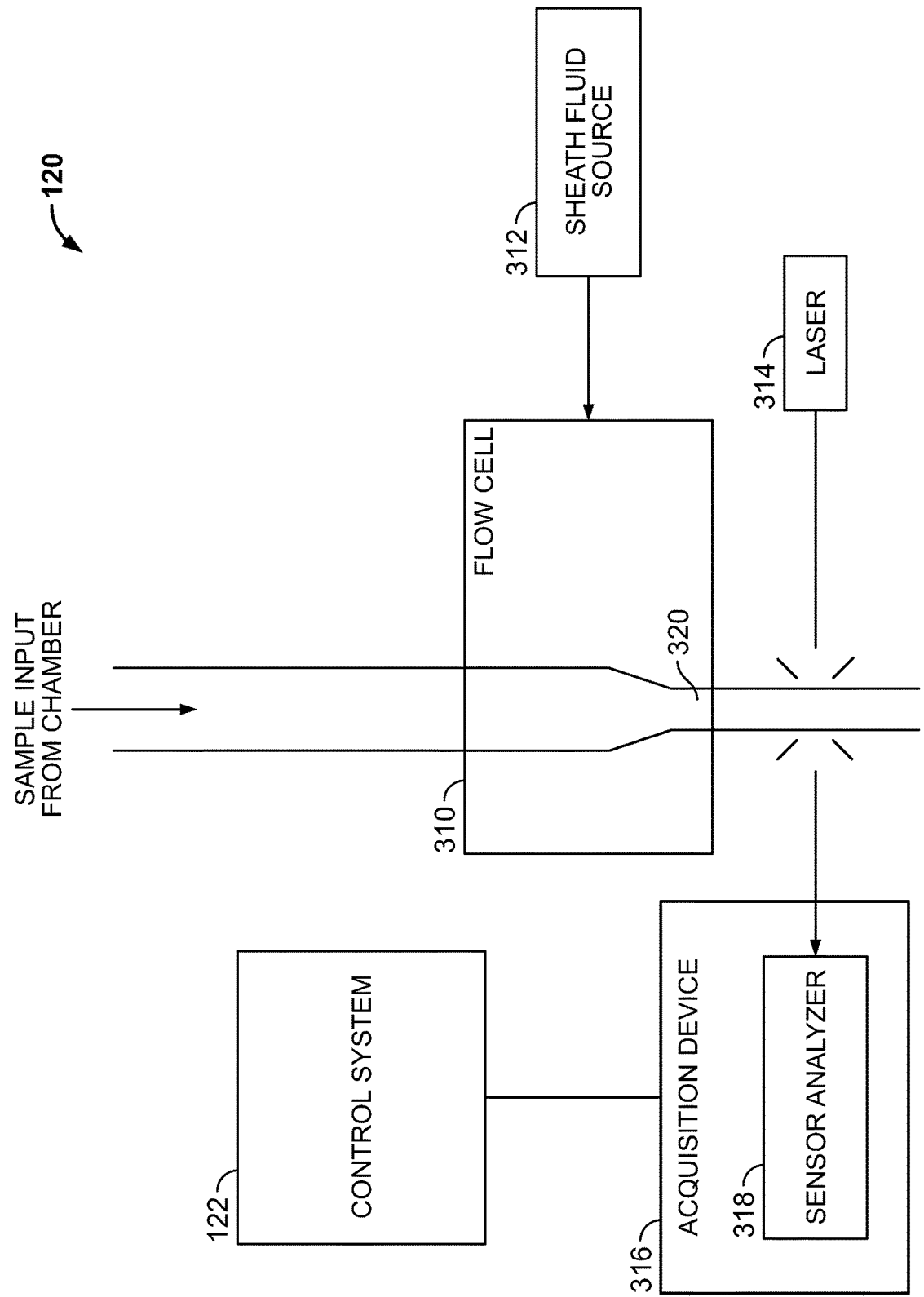
FIG. 7 is a schematic block diagram illustrating an example sample analyzing system.

FIG. 7 is a schematic block diagram illustrating an example sample analyzing system 120.

In this example, the sample analyzing system 120 includes a flow cell 310, a sheath fluid source 312, a laser 314, and an acquisition device 316 including a sensor analyzer 318.

The flow cell 310 (also referred to as a measuring chamber) includes an aperture 320 which can be clogged by oversized particles contained in a sample. The fluid circuit 130 becomes narrower at the aperture 320 to attempt to reduce the number of particles passing at once through the aperture 320 so that each particle is evaluated.

The sheath fluid source 312 is provided in some embodiments. The sheath fluid source 312 supplies a sheath fluid to the flow cell 310 where it is mixed with the sample. In some embodiments, the sheath fluid source is also used as a backflushing fluid to clean the fluid circuit 130 and remove trapped particles from the filtering device 102.

As depicted in FIG. 7, the flow cell 310 receives a sample from one of the mixing chambers 140 via the distribution system 118. In some embodiments, the sample flows through the aperture 320 and is analyzed by illuminating the sample stream with a laser beam from the laser 314. The acquisition device 316 uses the sensor analyzer 318 to detect characteristics of the sample, such as the way that the laser beam is scattered by the particles.

In some embodiments, the control system 124 operates to receive signals and/or data from the acquisition device 316 and interact with a user to display data relating to the characteristics of the particles in the sample.

Figure 8:
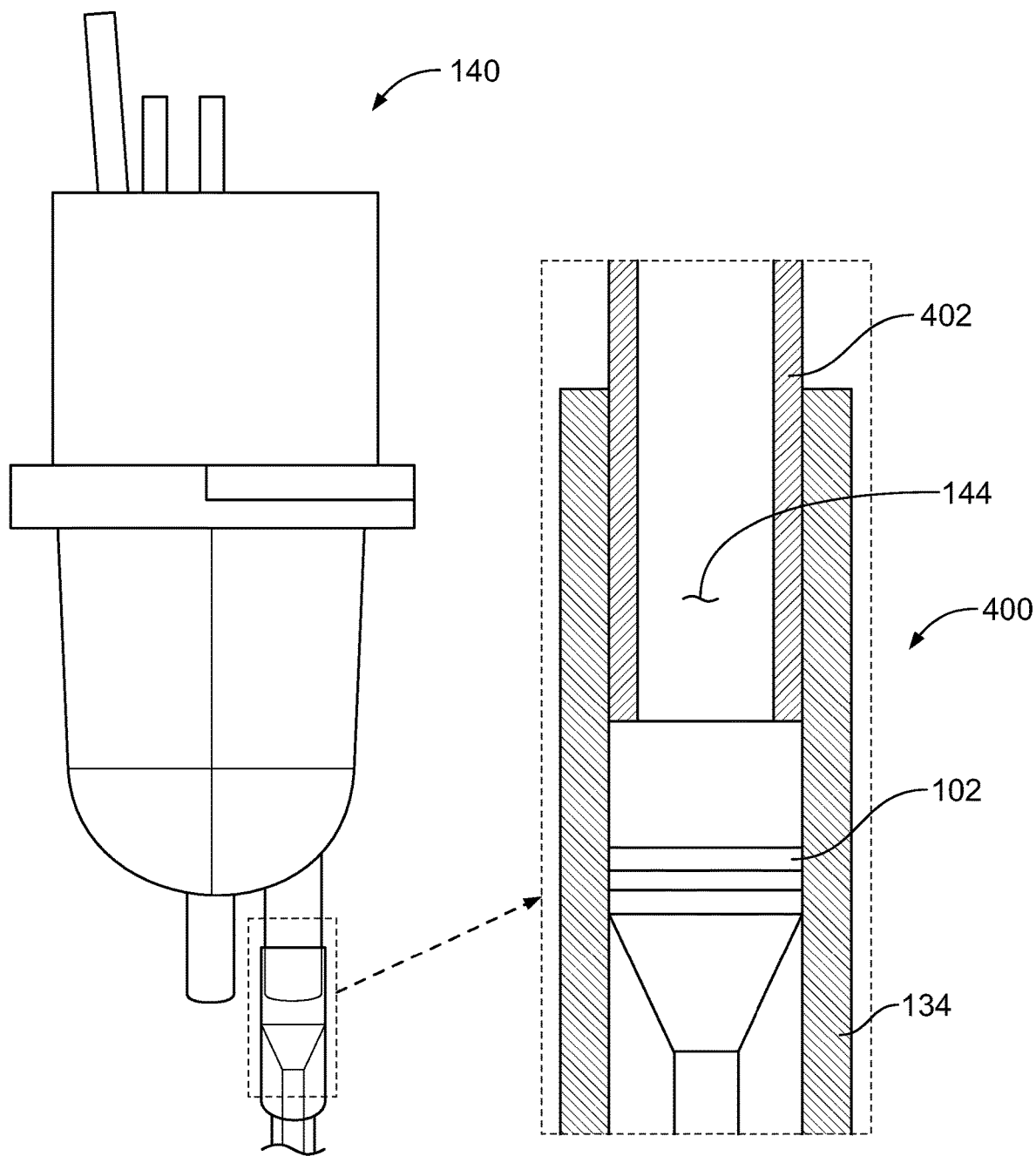
FIG. 8 schematically illustrates an example filtering system including the filtering device.

FIG. 8 schematically illustrates an example filtering system 400 including the filtering device 102. In this example, the filtering system 400 is configured to block the passage of oversized particles that can clog the sample analyzing system 120.

The filtering system 400 is arranged right after the mixing chamber 140. In some embodiments, the filtering device 102 is secured within the flow tube 136 so as to be arranged adjacent the outlet 144 of the mixing chamber 140. In other embodiments, the filtering device 102 is secured within an outlet port 402 of the mixing chamber 140 that defines the outlet 144 of the mixing chamber 140.

In some embodiments, the filtering system 400 is provided for a mixing chamber for preparing a NRBC sample (e.g., the first mixing chamber 270). In other embodiments, the filtering system 400 can be provided for other types of mixing chambers 140 (e.g., the second, third, and/or fourth mixing chambers 272, 274, and 276).

To reduce foreign particles, such as coring particles that enter a fluid path, many instruments have employed various techniques such as altering a probe's outer coating, altering a probe's surface roughness, or using different probe geometries. Some example instruments use a dual lumen venting probe with special coatings thereon to reduce the creation of coring particles. Other instruments reduce coring particles by piercing a cap of a sample container at an inclined manner with the cap or stopper oriented downwards and aspirating the sample into a closed system. Yet other instruments use an assembly for piercing a closed vial and then use another assembly for aspirating the sample. These approaches have reduced coring particles by relying on the probe's surface finish and/or geometry. However, these approaches are dependent on the wear life of the probe. As the probe pierces more tubes, the size and number of coring particles can change. For example, the inclined stopper piercing strategy can mitigate new coring particles from entering the sample fluidic pathway. However, such mitigation is limited to the number of previous times the stopper has been pierced and the number of coring particles in the tube. Further, a system that uses a piercing assembly and an aspirating assembly separately needs a complex mechanical assembly that requires more space and a greater number of parts to keep debris out of the sample path.

The filtering system 400 according to the present disclosure allows screening out oversized particles (e.g., foreign particles or contaminants such as coring particles) after the particles have been already introduced into the sample. In contrast to other approaches as described above, the filtering system 400 is made with a simple mechanism regardless of the condition of an aspiration probe.

Further, as the filtering system 400 is placed upstream from the sample analyzing system 120 as close as possible to the sample source 110, the oversized particles can be screened out as early as possible along the fluidic path, which thus reduces the extent that the foreign particles contaminate the fluidic path in the instrument 100.

The placement of the filtering system 400, as described herein, further allows the filtering device 102 to be backflushed during a diagnostic or clean-up cycle, in order to remove the oversized particles caught by the filtering device 102 and clear the fluid path for the next sample cycle. Accordingly, the instrument 100 with the filtering system 400 need not be switched to an offline mode, in which an analyzing process ceases, to handle clogging of the instrument 100 or clear the instrument 100 of screened oversized particles. As such, the instrument 100 with the filtering system 400 reduces a chance of turning into an offline condition that requires user intervention. The location of the filtering device 102, as described herein, allows for easy replacement as part of a tubing assembly (e.g., FIGS. 8 and 9) or a mixing chamber (e.g., FIG. 18). The arrangement of the filtering system 400 further provides a larger open area that can be used to capture a greater amount of debris before clogging. In contrast, other filtering systems including inline filtering devices provide a filtering area limited to the diameter of a sample line, thereby resulting in clogging sooner. Other advantages of the filtering system 400 over such inline filtering systems include the ability to flush the filter between cycles in which samples are undergoing analysis downstream of the filter in the flow cell.

Figure 9:
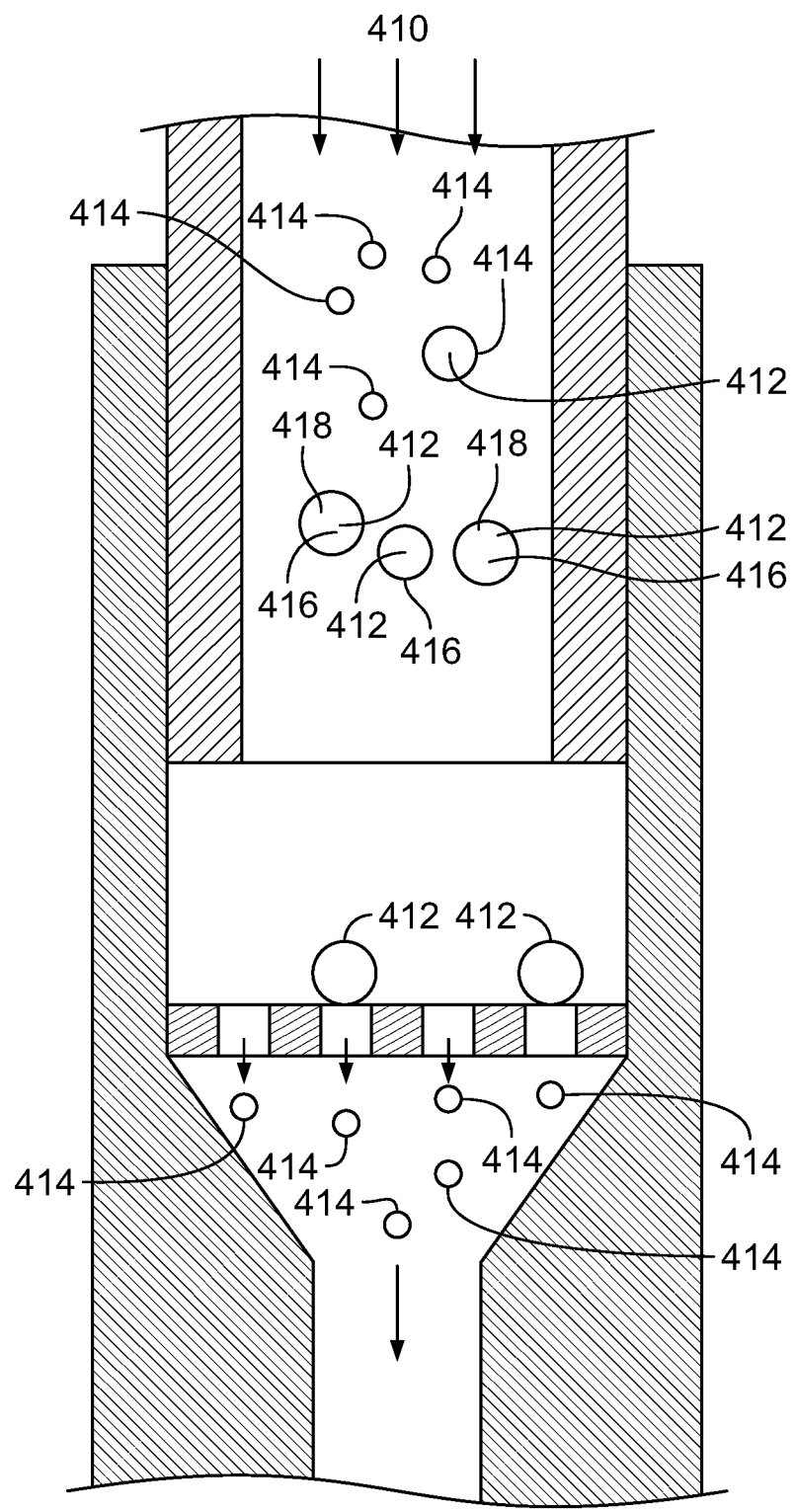
FIG. 9 illustrates an example operation of the filtering system.

FIG. 9 illustrates an example operation of the filtering system 400. As described above, the filtering system 400 includes the filtering device 102 configured to block the passage of oversized particles contained in the test fluid 410. The oversized particles 412 of the test fluid 410 can clog the sample analyzing system 120 (e.g., the aperture 320 of the flow cell 310) when passing through the sample analyzing system 120.

As prepared within a mixing chamber 140, the test fluid 410 can contain the sample particles 414 provided from the sample source 110, as well as the contaminants 416. In some embodiments, the contaminants 416 include coring particles 418 that are generated from the cap 152 as it is pierced by the sample aspiration probe 112. The contaminants 416 can also include dust or debris generated from other sources. The contaminants 416 including the coring particles 418 are typically oversized, i.e., sized to clog the sample analyzing system 120. In some embodiments, some of the sample particles 414 are oversized, and thus are not supposed to be tested by the sample analyzing system 120. The filtering device 102 is also designed to block such oversized sample particles 414 from flowing into the sample analyzing system 120.

Figure 10:
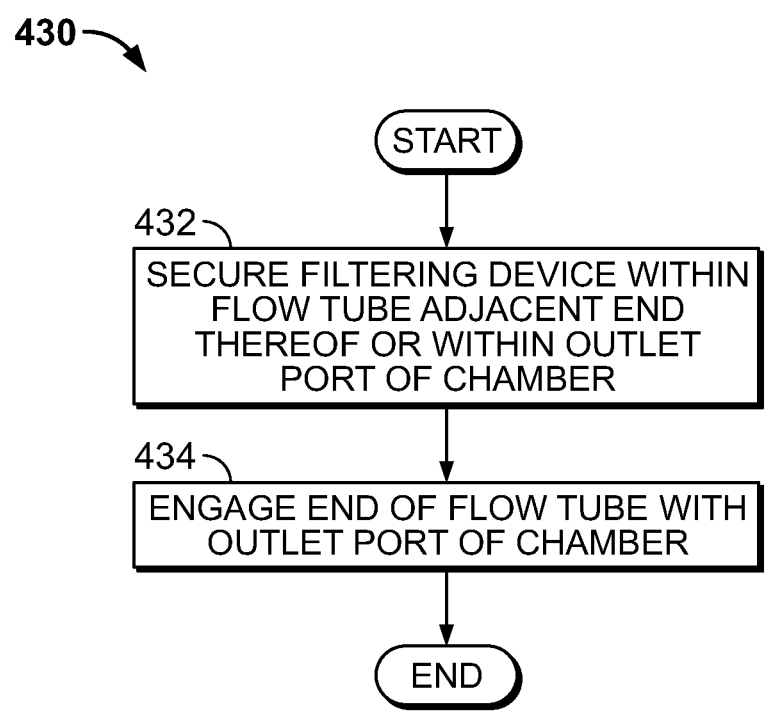
FIG. 10 is a flowchart illustrating an example method for installing the filter system.

FIG. 10 is a flowchart illustrating an example method 430 for installing the filtering system 400. In some embodiments, the method 430 includes operations 432 and 434.

At the operation 432, the filtering device 102 is secured within the flow tube 136 at or adjacent an end of the flow tube 136 that is connected with the outlet 144 (e.g., the outlet port 402) of a mixing chamber 140. Alternatively, the filtering device 102 is secured within the outlet port 402 of the mixing chamber 140.

In some embodiments, the filtering device 102 is interference-fit within the flow tube 136 or the outlet port 402. For example, the flow tube 136 is made of one or more flexible materials, and the filtering device 102 is sized to have a diameter slightly larger than an inner diameter of the flow tube 136. In other embodiments, the flow tube 136 or the outlet port 402 provides a filter support portion 490 for securing the filtering device 102 in place, as described in FIG. 15. In yet other embodiments, the filtering device 102 is bonded above the outlet port 402 within the mixing chamber 140, as described in FIG. 18.

At the operation 434, the end of the flow tube 136 is engaged with the outlet 144 (e.g., the outlet port 402) of the mixing chamber 140.

Figure 11:
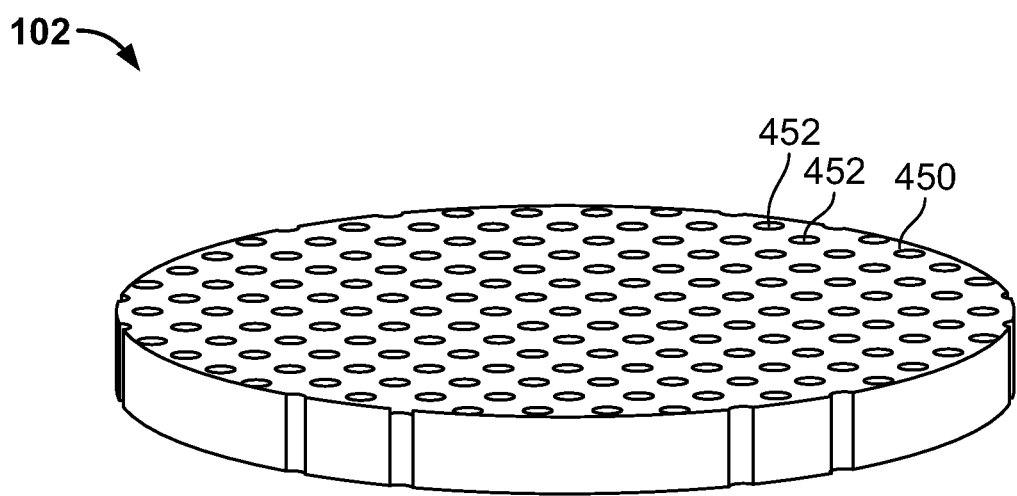
FIG. 11 schematically illustrates an example filtering device.
Figure 12:
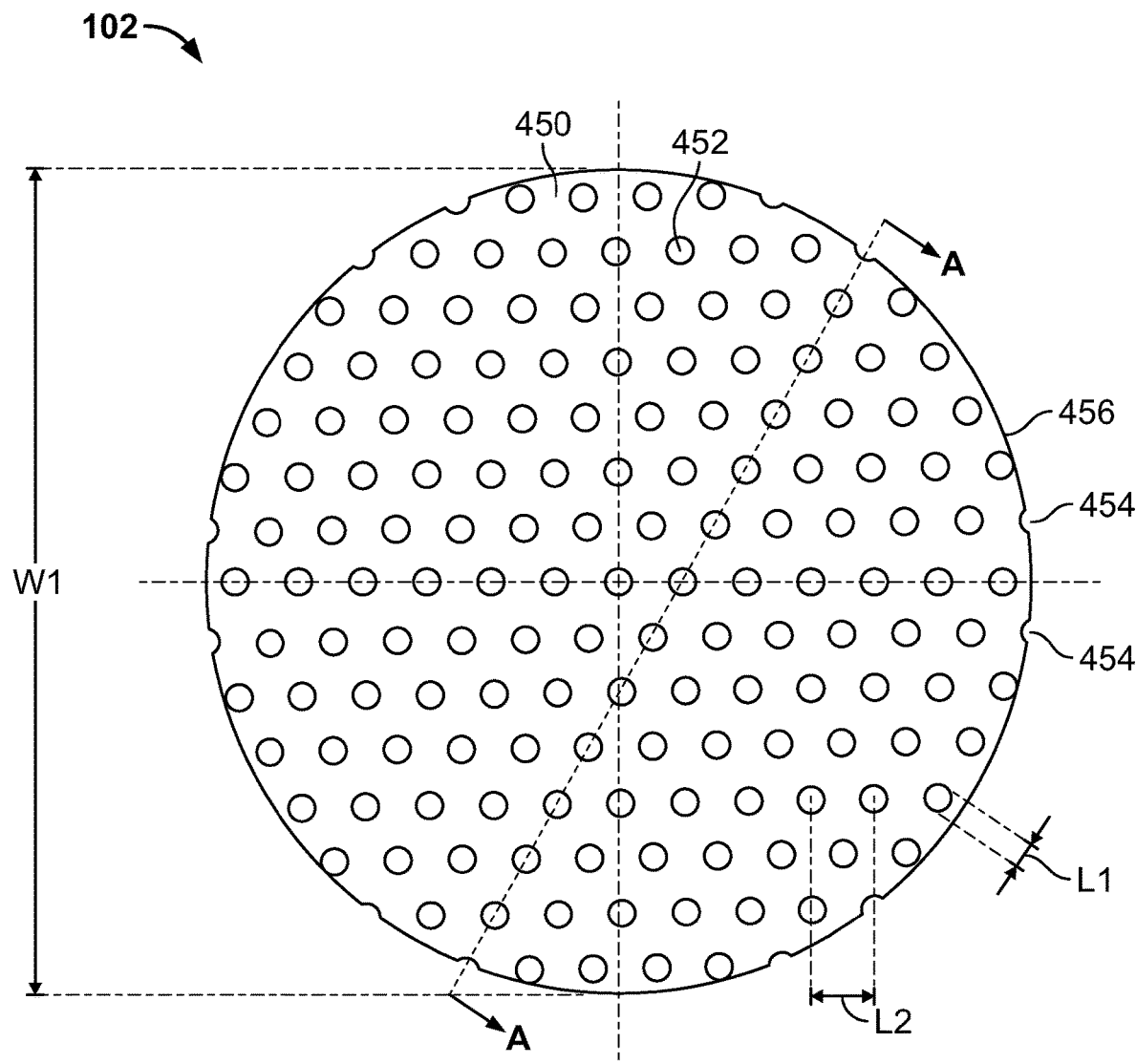
FIG. 12 is a front view of the example filtering device.

Referring to FIGS. 11-13, an example filtering device 102 is described.

FIG. 11 schematically illustrates an example filtering device 102. In this example, the filtering device 102 includes a body 450 including a plurality of apertures 452 formed therein.

In some embodiments, the body 450 of the filtering device 102 is formed as a circular disk screen that fits inside a flow path from a mixing chamber 140. The body 450 is typically formed of a piece of material, such as a sheet of stainless steel metal. One example of the body 450 is made of 316 stainless steel in accordance with the American Society for Testing and Materials (ASTM) A666 standard. Other materials can be used, provided that such materials do not significantly corrode or otherwise deteriorate when exposed to the materials that are passed through the fluid circuit 130. Other examples of possible materials are glass and plastic.

The apertures 452 are sized small enough to block oversized particles from passing through that are likely to clog the aperture of 320 of the sample analyzing system 120, but are sized large enough that they do not block the particles of interest.

The apertures 452 can have any desired shape. In this example, the apertures 452 have a circular cross-sectional shape. A benefit of a circular cross-sectional shape is that it has a substantially constant cross-sectional distance. Another benefit of a circular cross-sectional shape is that it reduces sharp corners, which could otherwise damage particles passing therethrough. However, other embodiments include apertures 452 having other shapes, such as triangular, square, rectangular, pentagonal, or different shapes. In some embodiments, the walls forming edges of the apertures 452 are smooth.

A plurality of apertures 452 are provided so that even when one of the apertures 452 becomes blocked by an oversize particle, one or more of the other apertures 452 remain open to permit continued flow of the sample. Typically, a larger quantity of apertures 452 is preferred, limited by the size of the body 172 and the precision of the aperture forming techniques. An advantage of having a larger quantity of apertures is that a greater quantity of oversized particles can be trapped by the filtering device 102 without clogging the filtering device 102.

FIG. 12 is a front view of the example filtering device 102. As described above, the example filtering device 102 includes the body 450 and the apertures 452.

In this example, the body 450 has a circular cross-sectional shape having a width W1 (which is consequently also the height and the diameter). The width W1 is sized to be slightly larger than the inner diameter of the flow tube 136 to which the filtering device 102 is secured, such that the filtering device 102 is interference fit within the flow tube 136. Other embodiments have other cross-sectional shapes, as desired. The body 450 can have various possible shapes and sizes. In some embodiments, the body 450 has a width W1 in a range from about 0.05 inches to about 0.2 inches. In another example embodiment, the body 450 has a width W1 of about 0.094 inches with tolerance of ±0.002 inches.

The apertures 452 extend through the body 450. In some embodiments, the apertures 452 are formed in the body 450 by an aperture forming process. An example of an aperture forming process is laser drilling. Another example of an aperture forming process involves photolithography.

As described above, it is preferable to have as many apertures 452 as possible to the extent of the size of the body 450 and the precision of the aperture forming techniques. In some embodiments, the filtering device 102 is made to have about 100 to 300 apertures. In other embodiments, the filtering device 102 has about 150 to 180 apertures. In yet other embodiments, the filtering device 102 has about 167 apertures.

In some embodiments, the body 450 has partial apertures 454 along an edge 456 of the body 450. The partial apertures 454 can be naturally formed as the body 450 is processed to form the apertures 452 thereon. The partial apertures 454 also operate to block oversized particles from passing through the filtering device 102 when the filtering device 102 is secured within the flow tube 136 (or the outlet port 144 of a mixing chamber 140) with the edge 456 abutted with an inner circumference of the flow tube 136 (or the outlet port 144). As such, the partial apertures 454 can increase the filtering effect of the filtering device 102. For example, the partial apertures 454 can reduce residue buildup (with oversized particles) that may take place at the interface between the edge 456 of the body 450 and the inner diameter of the flow tube 136 to which the filtering device 102 is secured.

In some embodiments, the apertures 452 have a cross-sectional distance L1. In the illustrated example, the apertures 452 have a circular cross-section, such that the distance L1 is also the diameter. However, other embodiments can have other cross-sectional shapes. In some embodiments, the cross-sectional distance L1 is a maximum cross-sectional distance.

The cross-sectional distance L1 is selected to block oversized particles that may clog the aperture 320 of the sample analyzing system 120, while permitting other smaller particles to pass through. In particular, the cross-sectional distance of the aperture 320 should not be less than (or at least not significantly less than) the cross-sectional distance of particles that are to be analyzed by the sample analyzing system 120.

Several exemplary dimensions will now be described, but other embodiments can have other dimensions. As one example, the sample analyzing system 120 has the aperture 320 with a cross-sectional distance L (shown in FIG. 7) of 50 to 100 microns, and is utilized to analyze particles having a 30 micron or less cross-section. In this example, the filtering device 102 is configured to have the apertures 452 that are sized smaller than or equal to the cross-sectional distance L, but also to have the apertures 452 that are sized larger than the cross-section of the particles to be analyzed. Such larger apertures can be adequate to remove large particles that can cause a hard plug, which can require multiple attempts for removal. For example, the cross-sectional distance L1 is in a range from about 50 microns (0.00197 inches) to about 100 microns (0.00394 inches), or in a range from about 70 microns (0.00276 inches) to about 80 microns (0.00315 inches), and preferably about 76.20 microns with tolerance of ±15.24 microns (0.0030 inches±0.0006 inches).

The apertures 452 are spaced apart at a predetermined aperture spacing distance L2. In some embodiments, the aperture spacing distance L2, which can be measured between the centers of adjacent apertures 452, ranges from about 0.001 inches to about 0.01 inches. In other embodiments, the aperture spacing distance L2 ranges from about 0.005 inches to about 0.008 inches. In yet other embodiments, the aperture spacing distance L2 is about 0.007 inches.

In some embodiments, the filtering device 102 is configured to have a total surface area of about 0.0069 square inches and a total open area (formed by the apertures 452) of about 0.0015 square inches. Other total surface areas and total open areas are possible in other embodiments.

The filtering device 102 is configured to have a predetermined ROB number. A ROB number indicates a relative resistance to blockage of a filter screen. The higher the ROB number is, the greater the resistance to blockage is. A fluid contamination level per MIL-STD-1246 Class 200 is chosen as the basis of comparison with the ROB number defined as:

$$ROB = \frac{N}{63.25n}$$

where $n=10^{(4.9029-0.926\ log^2 d)}$ d=aperture size (µ)

N=the number of apertures in the screen

In some embodiments, the filtering device 102 is configured to have a ROB number of about 0.04 to about 0.08. In other embodiments, the ROB number of the filtering device 102 ranges from about 0.05 to about 0.07. In yet other embodiments, the ROB number of the filtering device 102 is about 0.063.

The filtering device 102 is configured to have a predetermined Lohm rate. A Lohm rates indicates a measurement of resistance to fluid flow. A Lohm rate is defined such that 1 Lohm will flow 100 gallons per minute of water with a pressure drop of 25 psi at a temperature of 80° F. In other words, a Lohm is defined as follows:

Lohms=100/(flow(gal/min H$_2$O @25 psid))

In some embodiments, the filtering device 102 is configured to have a Lohm rate of about 100 to about 500 up to 1000. In other embodiments, the Lohm of the filtering device 102 ranges from about 200 to about 400. In yet other embodiments, the Lohm of the filtering device 102 is about 300.

In some embodiments, the surface of the body 450 is finished such that the body 450 has a surface finish of 32√ MAX. Further, the body 450 is passivated in accordance with ASTM A967 standard. The body 450 is processed to be free of burrs around the apertures 452, except around the outside diameter of the body 450 where the partial apertures 454 are located.

A process for selecting the aperture size and other dimensions and tolerances is dependent on the size ranges of the highest populations of oversized particles that would travel through a path where the filtering device 102 is placed. To optimize the effectiveness of the filtering device 102, a dimension of the aperture 320 that is to be protected by the filtering device 102 should be considered to adjust the size of the apertures 452 of the filtering device 102.

FIG. 13 is a cross-sectional side view of the example filtering device 102 taken along cross-section A-A shown in FIG. 12. The filtering device 102 includes the body 450 and the apertures 452.

The cross-sectional distance L1 of the apertures 452, which is discussed in more detail herein with reference to FIG. 12, is also visible in FIG. 13.

Additionally, FIG. 13 illustrates a thickness of the body 450, which is also the length L3 of the apertures 452. In some embodiments, the length L3 is similar to the cross-sectional distance L1 of the apertures 452. For example, the apertures 452 have a length (L3) to cross-sectional distance (L1) ratio of about 1. In some embodiments, the thickness L3 of the body 450 ranges from about 0.0019 inches to about 0.0040 inches). In other embodiments, the thickness L3 ranges from about 0.0027 inches to about 0.0032 inches. In yet other embodiments, the thickness L3 is about 0.0025 inches±0.0010 inches. Other embodiments have other lengths.

In some embodiments, the apertures 452 include upstream tapered portions 458 so that the apertures 452 are wider in the upstream direction than in the downstream direction. In other embodiments, the apertures 452 further include downstream tapered portions 460 that make the apertures 452 wider in the downstream direction.

Figure 14:
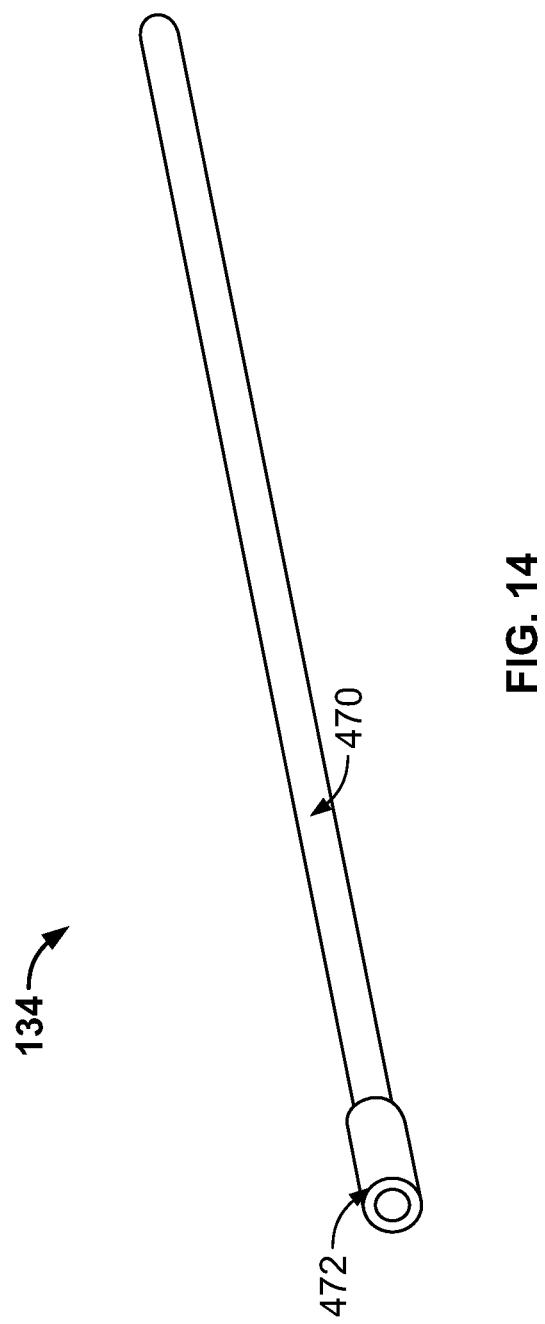
FIG. 14 is a schematic perspective view of an example flow tube.
Figure 15:
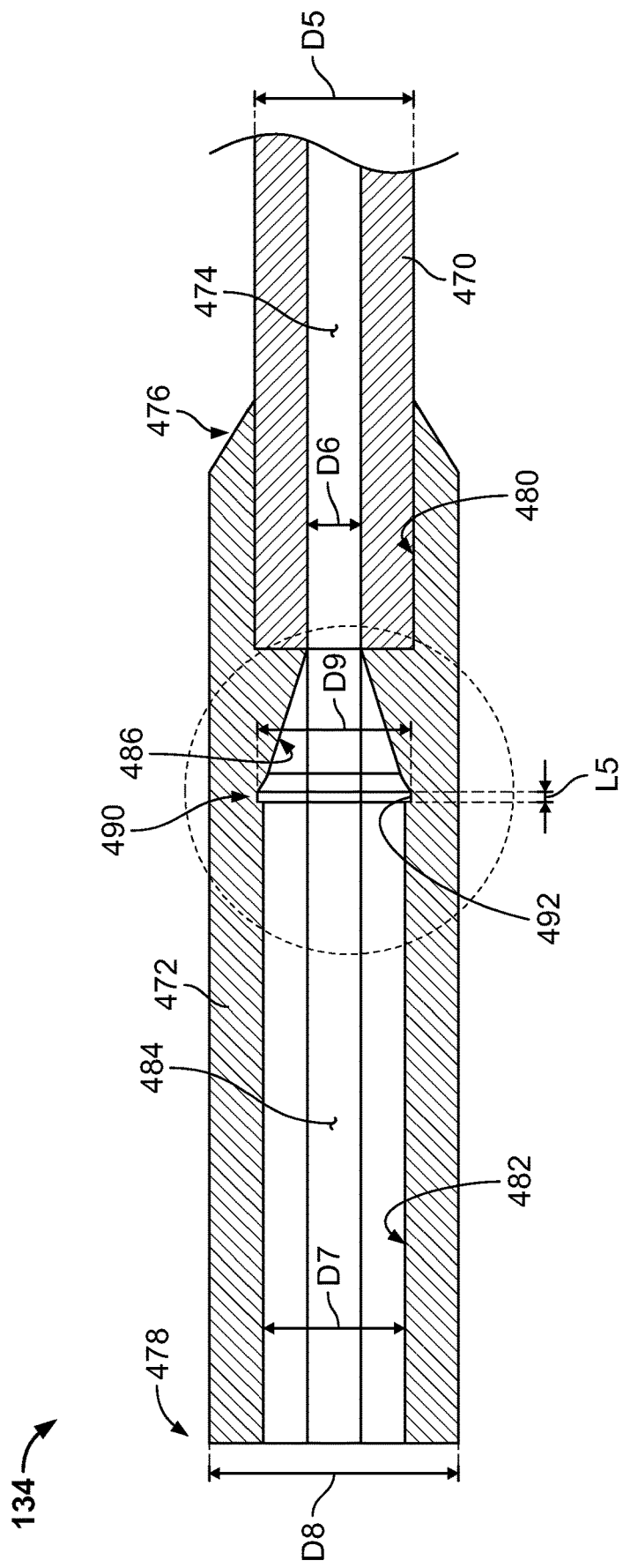
FIG. 15 is a cross sectional view of the flow tube of FIG. 14, taken along the length of the flow tube.
Figure 16:
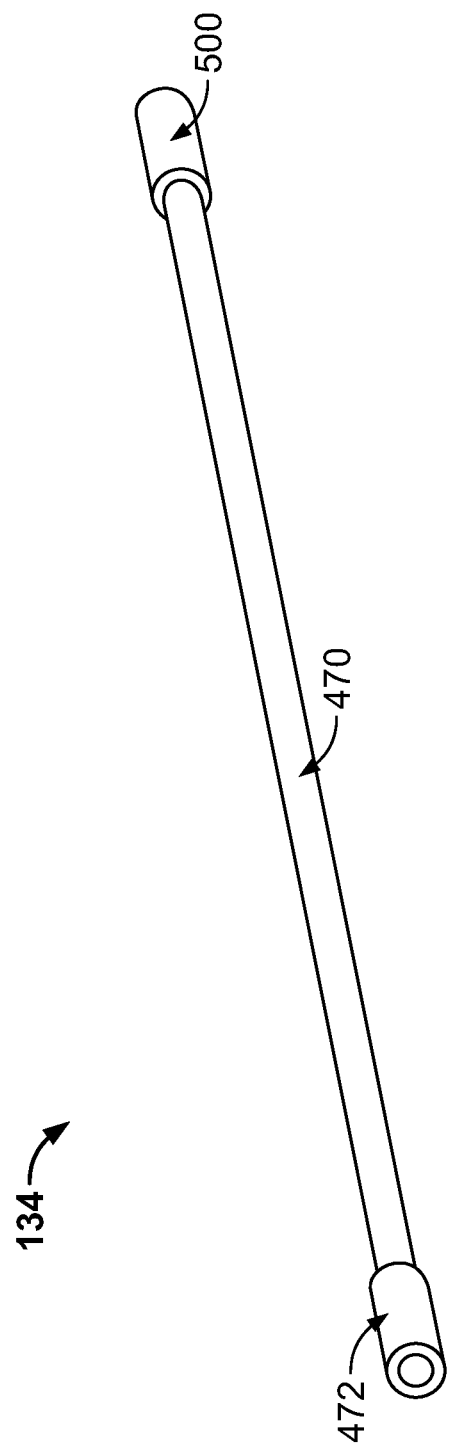
FIG. 16 is a schematic perspective view of another example flow tube.
Figure 17:
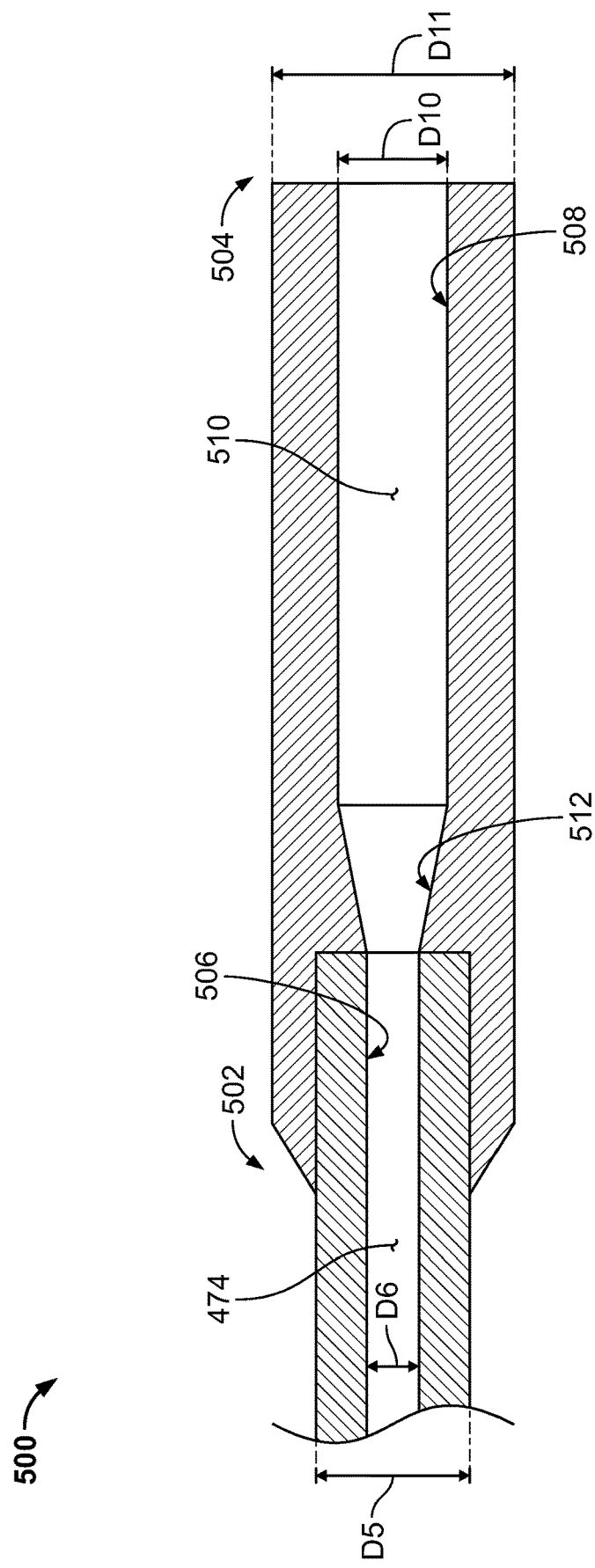
FIG. 17 is a cross sectional view of the flow tube of FIG. 16, taken along the length of the flow tube, illustrating a second end fitting.

With reference to FIGS. 14-17, examples flow tubes 136 are described. In particular, FIGS. 14 and 15 illustrate an example flow tube 136, and FIGS. 16 and 17 illustrate another example flow tube 136.

FIG. 14 is a schematic perspective view of an example flow tube 136. In this example, the flow tube 136 is configured to be used with a NRBC mixing chamber (e.g., the first mixing chamber 270). In some embodiments, the flow tube 136 includes a tubing 470 with an end fitting 472 at one end of the tubing 470. The end fitting 472 is secured to one end of the tubing 470 and configured to be engaged with the outlet port 144 of a mixing chamber 140.

The flow tube 136 is made of one or more flexible materials. In some example, the flow tube 136 is made of polyurethane elastomer.

FIG. 15 is a cross sectional view of the flow tube 136 of FIG. 14, taken along the length of the flow tube 136. As described, the flow tube 136 includes the tubing 470 and the end fitting 472.

In some embodiments, the tubing 470 is sized to have an outer diameter D5 that ranges from about 0.050 inches to about 0.120 inches. In other embodiments, the tubing 470 has an outer diameter D5 of about 0.090 inches.

The tubing 470 defines a flow channel 474 along the length of the tubing 470. In some embodiments, the flow channel 474 has an inner diameter D6 of about 0.020 inches to about 0.040 inches. In other embodiments, the inner diameter D6 of the flow channel 474 is about 0.030±0.002 inches.

As illustrated, the end fitting 472 engages an end of the tubing 470. In some embodiments, the end fitting 472 has a first end 476 and a second end 478 opposite to the first end 476. The end fitting 472 defines a tubing engaging portion 480 at the first end 476 that is configured to receive and secure an end of the tubing 470. In some embodiments, the end fitting 472 and the tubing 470 are integrally formed.

The end fitting 472 is configured to be engaged with the outlet port 144 of a mixing chamber 140 at the second end 478 thereof. The end fitting 472 defines an outlet receiving portion 482, at least a portion of which is configured to receive and secure the outlet port 144 of a mixing chamber 140. The outlet receiving portion 482 has an inner diameter D7 adapted to sealingly secure the outlet port 144 of a mixing chamber 140. In some embodiments, the inner diameter D7 of the outlet receiving portion 482 ranges from about 0.07 inches to about 0.08 inches. In other embodiments, the inner diameter D7 is about 0.081 inches.

The end fitting 472 has an outer diameter D8 that can range from about 0.100 inches to about 0.200 inches. In some embodiments, the outer diameter D8 of the end fitting 472 is about 0.140 inches.

In some embodiments, the inner diameter D7 of the end fitting 472 is configured to be larger than the inner diameter D6 of the tubing 470. In such configurations, a flow channel 484 defined within the end fitting 472 can transition to the flow channel 474 of the tubing 470 via a funnel portion 486. The funnel portion 486 provides a tapered surface that gradually decreases in diameter from the flow channel 484 of the end fitting 472 to the flow channel 474 of the tubing 470 in the downstream direction. The funnel portion 486 is forced up against the bottom of the mixing chamber 140. Further, the funnel portion 486 reduces corners or sharp edges to which contaminants can stick, thereby increasing the screening effect and making the cleaning of the filtering system 400 easier.

A filter support portion 490 can be provided to the end fitting 472 to secure the filtering device 102 therein. In some embodiments, the filter support portion 490 includes a groove 492 formed around the circumference of the inner surface of the end fitting 472. In some embodiments, the filter support portion 490 is defined on the inner surface of the flow channel 484 or at the lip of the funnel portion 486 (as shown in FIG. 15). The filter support portion 490 can be sized to interference-fit the filtering device 102 therein. In some embodiments, the filter support portion 490 has a diameter D9 that ranges from about 0.060 inches to about 0.100 inches. In other embodiments, the diameter D9 of the filter support portion 490 is about 0.087 inches±0.002 inches. The filter support portion 490 has a thickness L5 that ranges from about 0.003 inches to about 0.010 inches. In other embodiments, the thickness L5 of the filter support portion 490 is about 0.005 inches±0.002 inches.

FIG. 16 is a schematic perspective view of another example flow tube 136. In this example, the flow tube 136 is configured to be used with a NRBC mixing chamber (e.g., the first mixing chamber 270). The flow tube 136 in this example is configured similarly to the flow tube 136 as illustrated in FIG. 14, except for a second end fitting 500. In particular, the flow tube 136 includes a tubing 470 with a first end fitting 472 and a second end fitting 500 on both ends of the tubing 470. The tubing 470 and the first end fitting 472 are the same as those described in FIGS. 14 and 15, and, therefore, the description of the tubing 470 and the first end fitting 472 are omitted for brevity purposes.

The second end fitting 500 is secured to the other end of the tubing 470 opposite to the first end fitting 472 and configured to be engaged with a predetermined component in the instrument 100. In some examples, the second end fitting 500 is adapted to engage a port provided at the distribution system 118. In other examples, the second end fitting 500 is configured to be secured to a port provided at the sample analyzing system 120. The second end fitting 500 is configured to be engaged with other components in other embodiments.

FIG. 17 is a cross sectional view of the flow tube 136 of FIG. 16, taken along the length of the flow tube 136, illustrating the second end fitting 500 with the flow tube 136 in more detail.

In this example, the second end fitting 500 is configured similarly to the first end fitting 472 as illustrated in FIGS. 14 and 15. The second end fitting 500 has a first end 502 and a second end 504 opposite to the first end 502.

The second end fitting 500 defines a tubing engaging portion 506 at the first end 502 that is configured to receive and secure an end of the tubing 470. In some embodiments, the second end fitting 500 is integrally formed with the tubing 470. The second end fitting 500 is configured to be engaged with a port of a component at the second end 504 thereof.

The second end fitting 500 defines a port receiving portion 508, at least a portion of which is configured to receive and secure a port of a component. The port receiving portion 508 has an inner diameter D10 adapted to sealingly secure a port of a component. In some embodiments, the inner diameter D10 of the port receiving portion 508 ranges from about 0.03 inches to about 0.08 inches. In other embodiments, the inner diameter D10 is about 0.052 inches.

The second end fitting 500 has an outer diameter D11 that can range from about 0.100 inches to about 0.200 inches. In some embodiments, the outer diameter D11 of the second end fitting 500 is about 0.140 inches.

In some embodiments, the inner diameter D10 of the second end fitting 500 is configured to be larger than the inner diameter D6 of the tubing 470. In such configurations, the flow channel 474 of the tubing 470 can transition to a flow channel 510 defined within the second end fitting 500 via a tapered portion 512. The tapered portion 512 provides a tapered surface that gradually increases in diameter from the flow channel 474 of the tubing 470 to the flow channel 510 of the second end fitting 500 in the downstream direction.

Figure 18:
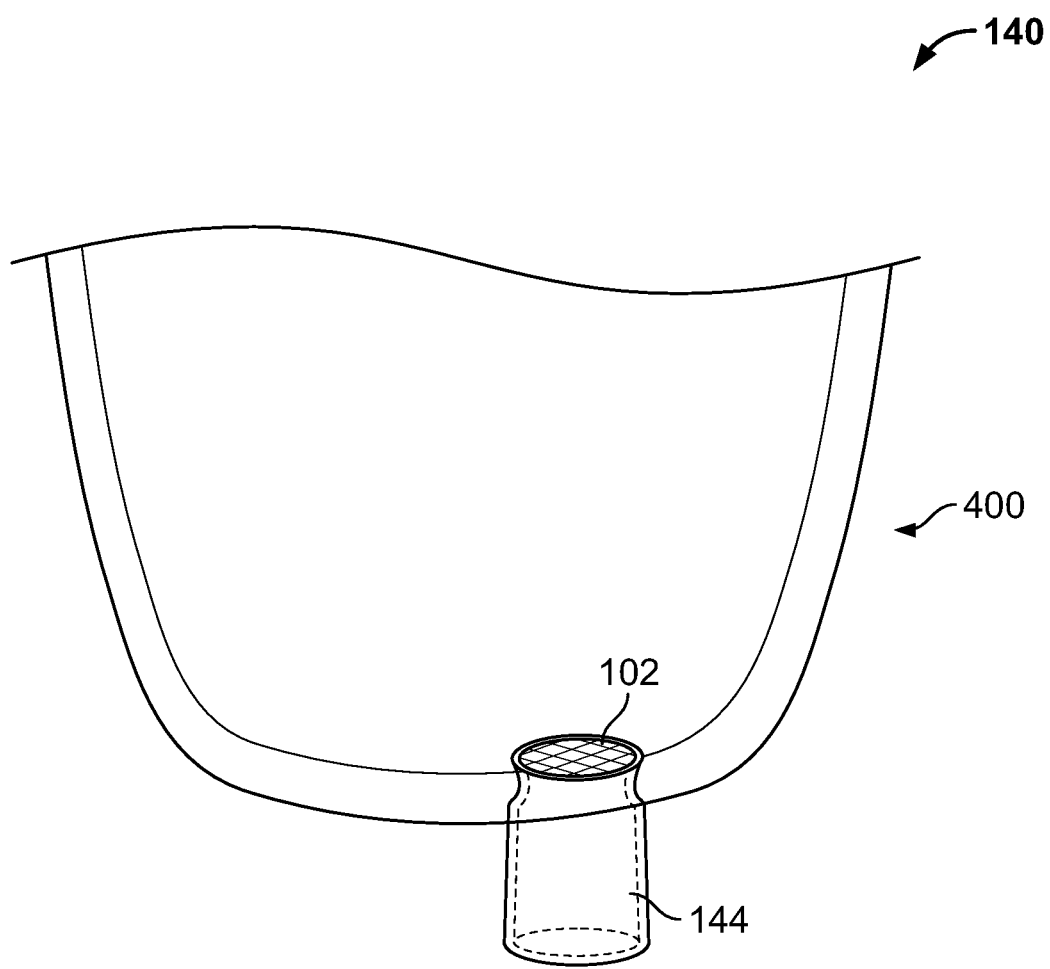
FIG. 18 schematically illustrates another example of the filtering system including the filtering device.

FIG. 18 schematically illustrates another example of the filtering system 300 including the filtering device 102. In this example, the filtering device 102 is arranged at the outlet 144 of the mixing chamber 140. In particular, the filter device 102 is positioned at an end of the outlet 144 within the mixing chamber 140. The filtering device 102 can be secured to the mixing chamber 140 in various manners. In some embodiments, the filtering device 102 is bonded above the outlet 144 within the mixing chamber 140.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method of filtering a sample in an analyzing instrument, the method comprising: preventing at least some of oversized particles from passing through a filtering device, wherein the filtering device is configured to stop at least some oversized particles from passing therethrough, the filtering device further comprising a non-mesh body having a plurality of approximately circular apertures and approximately semi-circular partial apertures, wherein the approximately semi-circular partial apertures surround an outside edge of the body and the body having a cross-sectional shape having a width sized slightly larger than the inner diameter of a flow tube and inserted into a groove in the flow tube; arranging the filtering device immediately downstream from a mixing chamber to which a sample is dispensed; connecting the flow tube to the outlet port to form a fluid communication path between the mixing chamber and a sample analyzing device; and filtering at least some of oversized particles from passing through the filtering device.

2. The method of claim 1, wherein:
arranging the filtering device includes securing a filtering device within a flow tube adjacent a first end of the flow tube; and
connecting the flow tube includes connecting the first end of the flow tube to the outlet port of the mixing chamber.

3. The method of claim 1, further comprising:
piercing a sample container with a probe of an aspiration device, the oversized particles at least partially generated from the sample container as the probe of the aspiration device pierces the sample container;
aspirating at least a portion of the sample from the sample container, the at least a portion of the sampling including a least a portion of the oversized particles;
inserting the probe through an inlet port of the mixing chamber;
dispensing the at least a portion of the sample into the mixing chamber; and
supplying the at least a portion of the sample from the mixing chamber to the sample analyzing device through the filtering device.

4. The method of claim 1, further comprising:
supplying a fluid backward to the mixing chamber to clean the mixing chamber and remove the oversized particles caught by the filtering device.

5. A system for filtering a sample in an analyzing instrument, the system comprising: a flow tube fitting to an outlet port of a mixing chamber and configured to form a fluid communication path between the mixing chamber and a sample analyzing device; and a filtering device arranged proximate to the mixing chamber, the filtering device configured to prevent at least some of oversized particles from passing therethrough while enabling particles to be analyzed to pass therethrough, wherein the filtering device includes a non-mesh body having a plurality of approximately circular apertures and approximately semi-circular partial apertures, wherein the approximately semi-circular partial apertures are formed along an edge of the body, an aspiration device, wherein the aspiration device pierces a sample container to aspirate at least a portion of the sample from the sample container to a probe, the probe configured to dispense the portion of the sample to the mixing chamber.

6. The system of claim 5, wherein the filtering device is arranged within the flow tube adjacent the outlet port of the mixing chamber.

7. The system of claim 5, wherein the filtering device is arranged within the outlet port of the mixing chamber.

* * * * *